US008891474B2

(12) United States Patent
Aiba et al.

(10) Patent No.: US 8,891,474 B2
(45) Date of Patent: Nov. 18, 2014

(54) MOBILE COMMUNICATION SYSTEM, BASE STATION APPARATUS, MOBILE STATION APPARATUS AND COMMUNICATION METHOD

(75) Inventors: Tatsushi Aiba, Osaka (JP); Daiichiro Nakashima, Osaka (JP); Kimihiko Imamura, Osaka (JP); Shoichi Suzuki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 120 days.

(21) Appl. No.: 13/699,204

(22) PCT Filed: May 6, 2011

(86) PCT No.: PCT/JP2011/060595
§ 371 (c)(1),
(2), (4) Date: Jan. 4, 2013

(87) PCT Pub. No.: WO2011/145460
PCT Pub. Date: Nov. 24, 2011

(65) Prior Publication Data
US 2013/0107835 A1    May 2, 2013

(30) Foreign Application Priority Data

May 21, 2010 (JP) ................................ 2010-117481

(51) Int. Cl.
*H04W 72/04* (2009.01)
*H04L 5/00* (2006.01)
*H04W 72/12* (2009.01)
*H04W 24/10* (2009.01)

(52) U.S. Cl.
CPC ........ *H04W 72/042* (2013.01); *H04W 72/1231* (2013.01); *H04W 72/1284* (2013.01); *H04W 24/10* (2013.01); *H04L 5/0007* (2013.01); *H04W 72/1289* (2013.01); *H04L 5/001* (2013.01)

USPC ............................ 370/329; 370/252; 370/328

(58) Field of Classification Search
CPC .................................................... H04W 72/04
USPC ......................................... 370/329, 252, 328
See application file for complete search history.

(56) References Cited

U.S. PATENT DOCUMENTS 8,155,062 B2 *   4/2012   Jung et al. ..................... 370/329
8,614,978 B2 *  12/2013   Che et al. ...................... 370/328

(Continued)

OTHER PUBLICATIONS

3GPP TS 36.213 V8.8.0, Technical Specification, 3rd Generation Partnership Project; Technical Specification Group Radio Access Network; Evolved Universal Terrestrial Radio Access (E-UTRA); Physical layer procedures, (Release 8), Sep. 2009, pp. 1-77.

(Continued)

*Primary Examiner* — Rasheed Gidado
(74) *Attorney, Agent, or Firm* — Birch, Stewart, Kolasch & Birch, LLP

(57) ABSTRACT

To specify flexibly one or more downlink component carriers for which a mobile station apparatus generates channel state information when performing communication using a plurality of component carriers complexly. A base station apparatus transmits to the mobile station apparatus a downlink control information format in which an information bit set to a value corresponding to one or more downlink component carriers requesting to report channel state information is included, and which is used for scheduling of a physical uplink shared channel, and the mobile station apparatus reports the channel state information for the one or more downlink component carriers to the base station apparatus using the physical uplink shared channel in accordance with the value set to the information bit, and a correspondence between a value set to the information bit and the one or more downlink component carriers is set in the mobile station apparatus by the base station apparatus using a signal of a higher layer.

6 Claims, 8 Drawing Sheets

(56) References Cited

U.S. PATENT DOCUMENTS

| | | | |
|---|---|---|---|
| 8,670,410 B2* | 3/2014 | Luo et al. | 370/331 |
| 2011/0243012 A1* | 10/2011 | Luo et al. | 370/252 |
| 2012/0327883 A1* | 12/2012 | Yang et al. | 370/329 |

OTHER PUBLICATIONS

Alcatel-Lucent, "Component carrier indication for bandwidth extension in LTE-A", 3GPP TSG-RAN WG1 #58, R1-093362, Shenzhen, China, Aug. 24-28, 2009, pp. 1-5.

Ericsson, "Carrier aggregation in LTE-Advanced", TSG-RAN WG1 #53bis, R1-082468, Warsaw, Poland, Jun. 30-Jul. 4, 2008, 6 pages.

International Search Report mailed on Jun. 14, 2011, issued in PCT/JP2011/060595.

Qualcomm Incorporated, "CQI for CA", 3GPP TSG RAN WG1 #61, R1-102745, Montreal, Canada, May 10-14, 2010, pp. 1-3.

Catt, CMCC, "Detail of CC (de-)activation", 3GPP TSG RAN WG2 Meeting #69, R2-101056, San Francisco, USA, Feb. 22-26, 2010, 6 pages.

LG Electronics, "Carrier Indicator Field Related Issues for Cross-carrier Scheduling in Carrier Aggregation", 3GPP TSG RAN WG1 #60, R1-101346, San Francisco, USA, Feb. 22-26, 2010, 6 pages.

Nokia Siemens Networks, Nokia, "CSI Reporting for Carrier Aggregation", 3GPP TSG RAN WG1 Meeting #60bis, R1-101894, Beijing, China, Apr. 12-16, 2010, 2 pages.

* cited by examiner

| CERTAIN SPECIFIC FIELD (EXAMPLE: 3 BITS) | DCC |
|---|---|
| 000 | DCC1 |
| 001 | DCC2 |
| 010 | DCC3 |
| 011 | DCC1, DCC2 |
| 100 | DCC2, DCC3 |
| 101 | DCC1, DCC3 |
| 110 | DCC1, DCC2, DCC3 |
| 111 | void |

FIG.5

MOBILE COMMUNICATION SYSTEM, BASE STATION APPARATUS, MOBILE STATION APPARATUS AND COMMUNICATION METHOD

TECHNICAL FIELD

The present invention relates to a mobile communication system comprised of a base station apparatus and a mobile station apparatus, and to a communication method.

BACKGROUND ART

3GPP (3rd Generation Partnership Project) is a project which performs investigation and creation of specification of a mobile communication system on the basis of a network in which W-CDMA (Wideband-Code Division Multiple Access) and GSM (Global System for Mobile Communications) are developed. In 3GPP, the W-CDMA system has been standardized as the 3rd generation cellular mobile communication system, and the services have been launched one after another. In addition, HSDPA (High-speed Downlink Packet Access) with a transmission speed further increased also has been standardized, and the services have been launched. In 3GPP, investigation with respect to a mobile communication system which realizes a furthermore high-speed data transmission and reception (hereinafter, referred to as "LTE-A (Long Term Evolution-Advanced)" or "Advanced-EUTRA") using evolution of the 3rd generation radio access technology (hereinafter, referred to as "LTE (Long Term Evolution)" or "EUTRA (Evolved Universal Terrestrial Radio Access)") and a wider frequency band, has been promoted.

As a communication system in LTE, an OFDMA (Orthogonal Frequency Division Multiple Access) method where user-multiplexing is performed by using mutually orthogonal subcarriers and an SC-FDMA (Single Carrier-Frequency Division Multiple Access) method are investigated. That is, in a downlink, the OFDMA method that is a multi-carrier communication system, and in an uplink, the SC-FDMA method that is a single-carrier communication system, are proposed.

On the other hand, as a communication system in LTE-A, introduction of the OFDMA method in a downlink, and a Clustered-SC-FDMA (Clustered-Single Carrier-Frequency Division Multiple Access, also referred to as DFT-S-OFDM with Spectrum Division Control, or DFT-precoded OFDM) method in addition to the SC-FDMA method in an uplink is investigated. Here, in LTE and LTE-A, the SC-FDMA method and Clustered-SC-FDMA method proposed as an uplink communication system, in terms of characteristics of the single-carrier communication method (owing to single-carrier characteristics), has a feature that PAPR (Peak to Average Power Ratio: transmit power) at the time of transmitting data (information) can be suppressed to a low level.

In addition, in LTE-A, it is investigated that while a frequency band used in a general mobile communication system is contiguous, a plurality of contiguous and/or non-contiguous frequency bands (hereinafter, referred to as "component carrier, element carrier (CC: Component Carrier)", or "carrier component, carrier element (CC: Carrier Component)") are used complexly and operated as one frequency band (wider frequency band) (frequency band aggregation: also referred to as Carrier aggregation, Frequency aggregation or the like). In addition, it is also proposed that for a base station apparatus and a mobile station apparatus to perform communication more flexibly using a wider frequency band, a frequency band used for downlink communication and a frequency band used for uplink communication are made to have a different frequency bandwidth (Asymmetric carrier aggregation) (Non-patent Document 1).

FIG. 6 is a figure describing a carrier-aggregated mobile communication system in a conventional technology. It is also referred to as symmetric frequency band aggregation (Symmetric carrier aggregation) that a frequency band used for communication of a downlink (DL) and a frequency band used for communication of an uplink (UL) are made to have the same bandwidth as shown in FIG. 6. As shown in FIG. 6, the base station apparatus and the mobile station apparatus can perform communication in a wider frequency band composed of a plurality of component carriers by using complexly a plurality of component carriers that is contiguous and/or non-contiguous frequency bands.

In FIG. 6, as an example, it is shown that a frequency band used for downlink communication having a bandwidth of 100 MHz (hereinafter, also referred to as DL system band, DL system bandwidth) is composed of five downlink component carriers (DCC1, DCC2, DCC3, DCC4, and DCC5) each having a bandwidth of 20 MHz. In addition, as an example, it is shown that a frequency band used for uplink communication having a bandwidth of 100 MHz (hereinafter, also referred to as UL system band, UL system bandwidth) is composed of five uplink component carriers (UCC1, UCC2, UCC3, UCC4, and UCC5) each having a bandwidth of 20 MHz.

In FIG. 6, downlink channels such as a physical downlink control channel (hereinafter, PDCCH), and a physical downlink shared channel (hereinafter, PDSCH) are mapped on each downlink component carrier. The base station apparatus allocates using PDCCH, to the mobile station apparatus, control information (resource allocation information, MCS (Modulation and Coding Scheme) information, HARQ (Hybrid Automatic Repeat Request) processing information, or the like) for transmitting a downlink transport block transmitted using PDSCH, and transmits the downlink transport block to the mobile station apparatus using PDSCH. Here, in FIG. 6, the base station apparatus can transmit up to five downlink transport blocks (PDSCH may be used) to the mobile station apparatus in the same subframe.

In addition, uplink channels such as a physical uplink control channel (hereinafter, PUCCH), and a physical uplink shared channel (hereinafter, PUSCH) are mapped on each uplink component carrier. The mobile station apparatus transmits using PUCCH and/or PUSCH, to the base station apparatus, channel state information (CSI: Channel Statement Information or Channel Statistical Information), and/or information (may be information indicating ACK/NACK for PDSCH) indicating ACK/NACK (positive response: Positive Acknowledgement/negative response: Negative Acknowledgement, ACK or NACK signal) of HARQ for a downlink transport block, and/or uplink control information (UCI) such as a scheduling request (SR). Here, in FIG. 6, the mobile station apparatus can transmit up to five uplink transport blocks (PUSCH may be used) to the base station apparatus in the same subframe.

Here, the channel state information (CSI) transmitted (reported, fed back) to the base station apparatus from the mobile station apparatus indicates the information (information indicating a channel quality for downlink) indicating a channel quality for a downlink signal transmitted from the base station apparatus. The mobile station apparatus measures (calculates, generates) a channel quality for a downlink signal transmitted from the base station apparatus, and transmits (reports, feeds back) it to the base station apparatus as the channel state information.

In the information, which is transmitted to the base station apparatus from the mobile station apparatus, indicating the channel state for the downlink signal, included are channel state information (CSI), and/or a channel quality identifier (CQI), and/or a precoding matrix indicator (PMI), and/or a rank indicator (RI).

Here, PMI and/or RI are used when the base station apparatus and the mobile station apparatus perform communication based on transmission diversity systems such as SDM (Space Division Multiplexing: space-multiplexing technology) and SFBC (Space-Frequency Block Diversity) using MIMO (Multiple Input Multiple Output), and CDD (Cycle Delay Diversity). MIMO is a generic name for a multi-input/multi-output system or technology, and the base station apparatus and the mobile station apparatus perform transmission with a plurality of input/output branches for the signal using a plurality of antennas in a transmitting side and a receiving side.

Here, a unit of a signal sequence which can be space-multiplexed and transmitted using MIMO is referred to as a stream, and the number (Rank) of the streams is determined by the base station apparatus in consideration of a channel state. In this case, the number of streams requested by the mobile station apparatus is transmitted to the base station apparatus as RI from the mobile station apparatus.

Furthermore, at the time of using SDM in a downlink, a preprocessing (hereinafter, referred to as "precoding") is performed on the transmission signal sequence in advance in order to separate correctly information on a plurality of streams transmitted from each antenna. Information on this precoding can be measured (calculated, generated) by the mobile station apparatus on the basis of an estimated channel state, and is transmitted as PMI from the mobile station apparatus to the base station apparatus.

Similarly, FIG. 7 is a figure describing an asymmetric carrier-aggregated mobile communication system in a conventional technology. As shown in FIG. 7, the base station apparatus and the mobile station apparatus configure a frequency band used for downlink communication and a frequency band used for uplink communication to have a different bandwidth, and can perform communication in a wider frequency band using complexly component carriers that are contiguous and/or non-contiguous frequency bands constituting these frequency bands.

In FIG. 7, as an example, it is shown that a frequency band used for downlink communication having a bandwidth of 100 MHz is composed of five downlink component carriers (DCC1, DCC2, DCC3, DCC4, and DCC5) each having a bandwidth of 20 MHz, and a frequency band used for uplink communication having a bandwidth of 40 MHz is composed of two uplink component carriers (UCC1 and DCC2) each having a bandwidth of 20 MHz.

Here, in FIG. 7, downlink/uplink channels are mapped on downlink/uplink component carriers, respectively, and the base station apparatus allocates PDSCH to the mobile station apparatus using PDCCH and transmits a downlink transport block to the mobile station apparatus using PDSCH. That is, in FIG. 7, the base station apparatus can transmit up to five downlink transport blocks (PDSCH may be used) to the mobile station apparatus in the same subframe.

In addition, the mobile station apparatus, using PUCCH and/or PUSCH, transmits to the base station apparatus channel state information, and/or information indicating ACK/NACK in HARQ for a downlink transport block (may be information indicating ACK/NACK for PDSCH), and/or uplink control information such as a scheduling request. Here, in FIG. 7, the mobile station apparatus can transmit up to two uplink transport blocks (PUSCH may be used) to the base station apparatus in the same subframe.

FIG. 8 is a figure showing an example of transmission of channel state information from the mobile station apparatus to the base station apparatus in a conventional technology. A base station apparatus 801 transmits to the mobile station apparatus a downlink signal 803 indicating by using which radio resource (radio resource block) a mobile station apparatus 802 transmits an uplink signal 804 including channel state information. The mobile station apparatus transmits channel state information to the base station apparatus using the radio resource indicated by the base station apparatus.

In FIG. 8, for example, the mobile station apparatus maps periodic channel state information (P-CSI) on the PUCCH resource allocated by the base station apparatus and transmits it to the base station apparatus. In addition, for example, the mobile station apparatus maps aperiodic channel state information (A-CSI) on the PUSCH resource allocated by the base station apparatus and transmits it to the base station apparatus.

For example, the base station apparatus transmits a transmission request of channel state information on PDCCH allocating the PUSCH resource to the mobile station apparatus (for example, sets a CSI request transmitted on PDCCH to "1"), and the mobile station apparatus having received this information maps channel state information on the PUSCH resource allocated by the base station apparatus and transmits it to the base station apparatus (Non-patent Document 2).

PRIOR ART DOCUMENT

Non-patent Document

Non-patent Document 1: "Carrier aggregation in LTE-Advanced", 3GPP TSG RAN WG1 Meeting #53bis, R1-082468, Jun. 30-Jul. 4, 2008.

Non-patent Document 2: "3GPP TSG RAN E-UTRA Physical layer procedure (Release 8)", 3GPP TS 36.213 V8.8.0, 2009-09.

DISCLOSURE OF THE INVENTION

Problems to be Solved by the Invention

However, in a conventional technology, since a system has been premised where the number of a downlink frequency band for which channel state information is generated is one between the base station apparatus and the mobile station apparatus, there is a problem that in a system where two or more downlink frequency bands for which channel state information is generated can be configured, generation objects of channel state information cannot be specified.

For example, when the base station apparatus and the mobile station apparatus perform communication using a plurality of component carriers complexly, there is a problem that it cannot be specified that the mobile station apparatus generates channel state information for a downlink signal(s) transmitted on which a downlink component carrier(s) among a plurality of downlink component carriers.

The base station apparatus schedules radio resources based on the channel state information transmitted from the mobile station apparatus. That is, when the downlink component carrier(s) to be a generation object of channel state information cannot be specified for the mobile station apparatus, the base station apparatus will not be able to schedule radio resources in consideration of spectrum efficiency.

The present invention is accomplished in view of the above-mentioned problems, and the object is to provide a mobile communication system, a base station apparatus, a mobile station apparatus and a communication method which are capable of specifying flexibly that the mobile station apparatus generates channel state information for a downlink signal(s) transmitted on which a downlink component carrier(s) when the base station apparatus and the mobile station apparatus perform communication using a plurality of component carriers complexly.

Means for Solving the Problems (1) In order to achieve the above-mentioned object, the present invention has taken the following measures. That is, a mobile communication system of the present invention is the one in which abase station apparatus and a mobile station apparatus perform communication using a plurality of component carriers, wherein: the base station apparatus transmits to the mobile station apparatus a downlink control information format in which an information bit set to a value corresponding to one or more downlink component carriers requesting to report channel state information is included, and which is used for scheduling of a physical uplink shared channel; and the mobile station apparatus reports the channel state information for the one or more downlink component carriers to the base station apparatus using the physical uplink shared channel in accordance with the value set to the information bit, and wherein a correspondence between a value set to the information bit and the one or more downlink component carriers is set in the mobile station apparatus by the base station apparatus using a signal of a higher layer.

(2) Moreover, a base station apparatus of the present invention is the one communicating with a mobile station apparatus using a plurality of component carriers, including: a unit transmitting to the mobile station apparatus a downlink control information format in which an information bit set to a value corresponding to one or more downlink component carriers requesting to report channel state information is included, and which is used for scheduling of a physical uplink shared channel; and a unit receiving from the mobile station apparatus the channel state information for the one or more downlink component carriers using the physical uplink shared channel in accordance with the value set to the information bit, wherein a correspondence between a value set to the information bit and the one or more downlink component carriers is set in the mobile station apparatus by the base station apparatus using a signal of a higher layer.

(3) In addition, a mobile station apparatus of the present invention is the one communicating with a base station apparatus using a plurality of component carriers, including: a unit receiving from the base station apparatus a downlink control information format in which an information bit set to a value corresponding to one or more downlink component carriers requested to report channel state information is included, and which is used for scheduling of a physical uplink shared channel; and a unit reporting the channel state information for the one or more downlink component carriers to the base station apparatus using the physical uplink shared channel in accordance with the value set to the information bit, wherein a correspondence between a value set to the information bit and the one or more downlink component carriers is set in the mobile station apparatus by the base station apparatus using a signal of a higher layer.

(4) Furthermore, a communication method of the present invention is the communication method of a base station apparatus communicating with a mobile station apparatus using a plurality of component carriers, including the steps of: transmitting to the mobile station apparatus a downlink control information format in which an information bit set to a value corresponding to one or more downlink component carriers requesting to report channel state information is included, and which is used for scheduling of a physical uplink shared channel; and receiving from the mobile station apparatus the channel state information for the one or more downlink component carriers using the physical uplink shared channel in accordance with the value set to the information bit, wherein a correspondence between a value set to the information bit and the one or more downlink component carriers is set in the mobile station apparatus by the base station apparatus using a signal of a higher layer.

(5) In addition, a communication method of the present invention is the communication method of a mobile station apparatus communicating with a base station apparatus using a plurality of component carriers, including the steps of: receiving from the base station apparatus a downlink control information format in which an information bit set to a value corresponding to one or more downlink component carriers requested to report channel state information is included, and which is used for scheduling of a physical uplink shared channel; and reporting the channel state information for the one or more downlink component carriers to the base station apparatus using the physical uplink shared channel in accordance with the value set to the information bit, wherein a correspondence between a value set to the information bit and the one or more downlink component carriers is set in the mobile station apparatus by the base station apparatus using a signal of a higher layer.

Effect of the Invention

According to the present invention, when the base station apparatus and the mobile station apparatus perform communication using a plurality of component carriers complexly, it can be specified flexibly that the mobile station apparatus generates channel state information for a downlink signal transmitted on which downlink component carrier.

BRIEF DESCRIPTION OF THE DRAWINGS

FIG. 5 is a figure showing an example of indication of a downlink component carrier;

BEST MODES FOR CARRYING OUT THE INVENTION

Figure 1:
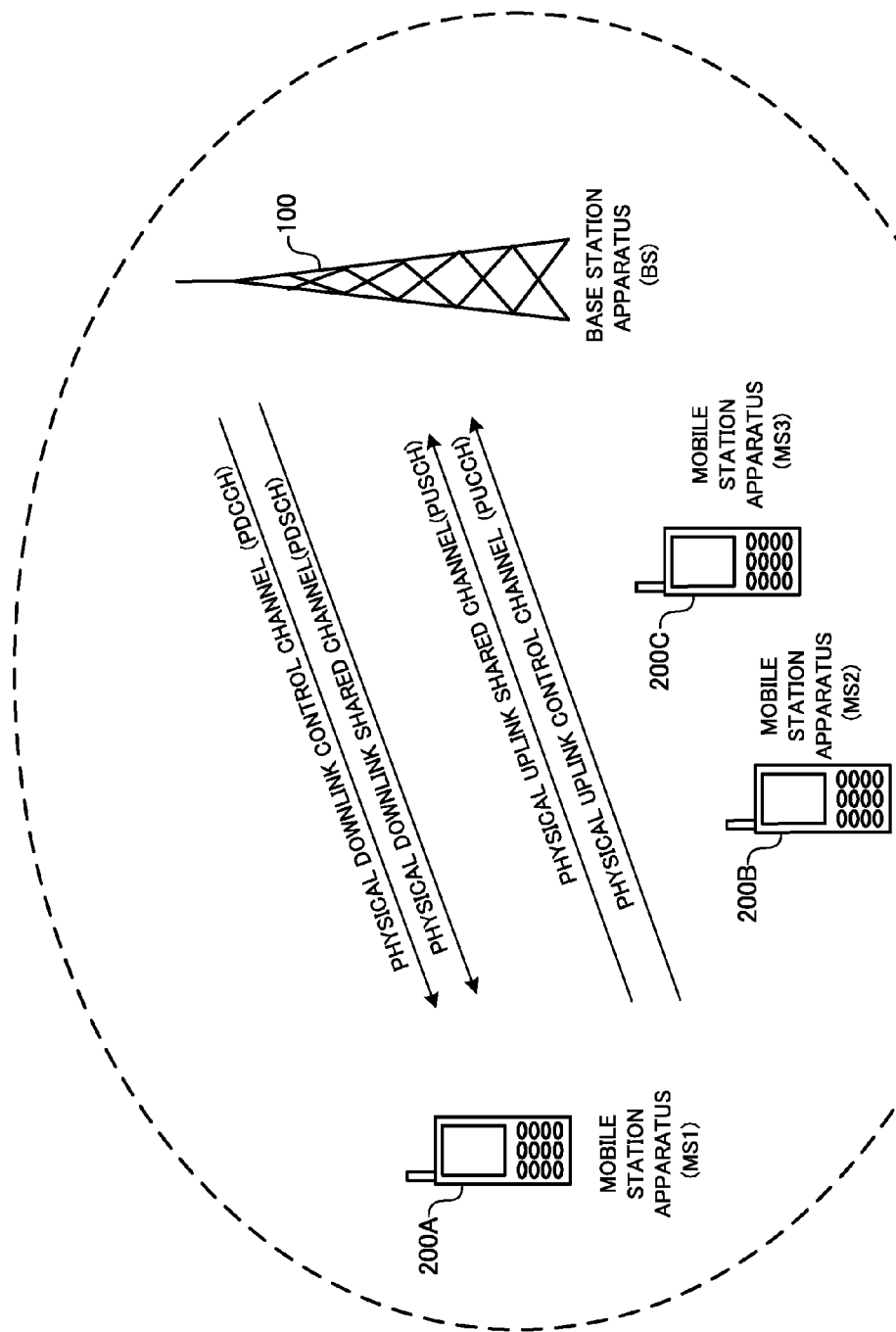
FIG. 1 is a figure showing conceptually a configuration of physical channels according to an embodiment of the present invention.

Then, an embodiment according to the present invention will be described with reference to figures. FIG. 1 is a figure showing a configuration example of channels in the embodiment of the present invention. Downlink physical channel includes channels such as a physical downlink control channel (PDCCH), and a physical downlink shared channel (PDSCH). Uplink physical channel includes channels such as a physical uplink shared channel (PUSCH), and a physical uplink control channel (PUCCH).

PDCCH is a channel used for giving notification (specification) of a resource allocation of PDSCH, HARQ processing information for downlink data, a resource allocation of PUSCH or the like to a mobile station apparatus 200 (mobile station apparatuses 200A to 200C of FIG. 1 are collectively referred to as a mobile station apparatus 200). PDCCH is composed of a plurality of control channel elements (CCE), and the mobile station apparatus 200 receives PDCCH from a base station apparatus 100 by detecting PDCCH composed of CCE. This CCE is composed of a plurality of resource element groups (REG, also referred to as mini-CCE) distributed in a frequency domain and a time domain. Here, the resource element is a unit resource composed of 1 OFDM symbol (time component) and 1 subcarrier (frequency component).

Here, a plurality of formats is defined for downlink control information (DCI) transmitted on PDCCH. Hereinafter, a format of the downlink control information is also referred to as a DCI format (Downlink Control Information Format).

For example, as a DCI format for a downlink, defined is a format used when the base station apparatus 100 transmits on PDSCH by a transmission diversity system using one transmission antenna port or a plurality of transmission antenna ports. In addition, for example, as a DCI format for a downlink, defined is a format used when the base station apparatus 100 transmits on PDSCH by SDM using MIMO. That is, as a DCI format for a downlink, defined is a format used for the base station apparatus 100 to allocate (schedule) PDSCH.

Here, PDCCH for a DCI format used for allocating (scheduling) PDSCH is mapped by the base station apparatus 100 in a mobile station apparatus specific search space (also referred to as USS: User equipment specific Search Space) where a certain (specific) mobile station apparatus 200 attempts to search (detection) of PDCCH.

Furthermore, for example, as a DCI format for an uplink, defined is a format used when the mobile station apparatus 200 transmits on PUSCH by one transmission antenna port. In addition, for example, as a DCI format for an uplink, defined is a format used when the mobile station apparatus 200 transmits on PUSCH by SDM using MIMO. That is, as a DCI format for an uplink, defined is a format used for the base station apparatus 100 to allocate (schedule) PUSCH.

Here, information transmitted using a DCI format which allocates (schedules) PUSCH by the base station apparatus 100 includes, for example, information (Flag for format differentiation) used for discrimination from other DCI formats, information (Hopping flag) indicating a transmission accompanied by a hopping, resource allocation information (Resource block assignment) for PUSCH, information (Modulation and Coding Scheme and Redundancy version) indicating a modulation scheme, a coding rate and a parameter for retransmission, information (New data indicator) for identifying whether transmission data is new data, TPC command (TPC command for scheduled PUSCH) information for scheduled PUSCH, information (Cyclic shift for DM RS) indicating a cyclic shift applied to a demodulation reference signal, information (CSI request) indicating whether a transmission of channel state information is instructed, information (component carrier indicator field, CIF: Carrier Indicator Field) indicating an uplink component carrier where scheduled PUSCH is mapped, and Padding bits. That is, fields (information fields) to which these pieces of information (information bits) are mapped is defined in a DCI format.

Here, PDCCH for a DCI format used for allocating (scheduling) PUSCH is mapped by the base station apparatus 100 in a mobile station apparatus specific search space (also referred to as USS: User equipment specific Search Space) where a certain (specific) mobile station apparatus 200 attempts to search (detection) of PDCCH.

In addition, for example, as a DCI format, defined is a format used for a group scheduling for a plurality of mobile station apparatuses 200. For example, as a DCI format, defined is a format including a plurality of TPC commands (Transmission Power Control Command) for a plurality of mobile station apparatuses 200.

Here, PDCCH where a DCI format used for a group scheduling for a plurality of mobile station apparatuses 200 is transmitted, since PDCCH needs to be received (detected) by a plurality of mobile station apparatuses 200, is mapped by the base station apparatus 100 in a common search space (CSS) where all the mobile station apparatuses 200 attempts to search (detection) of PDCCH.

PDCCH is subjected to Separate Coding for every mobile station apparatus 200 and for every type. That is, the mobile station apparatus 200 detects a plurality of PDCCHs, and acquires a downlink resource allocation, and/or an uplink resource allocation, and/or other control information. To each PDCCH, a CRC (cyclic redundancy check) is given, and the mobile station apparatus 200, on each set of CCE where PDCCH may be composed, performs CRC checking, and acquires PDCCH where CRC has succeeded as PDCCH addressed to its own apparatus.

This is also referred to as blind decoding, and a region of a set of CCE where PDCCH on which the mobile station apparatus 200 performs the blind decoding may be composed is referred to as a Search Space. In the search space, included are the mobile station apparatus specific search space (USS) and the common search space (CSS) which are mentioned above. That is, the mobile station apparatus 200 performs the blind decoding on CCE in the search space, and detects PDCCH addressed to its own apparatus.

The mobile station apparatus 200, when resource allocation of PDSCH is transmitted on PDCCH addressed to its own apparatus, based on the resource allocation indicated by PDCCH from the base station apparatus 100, receives using PDSCH a downlink signal (downlink data (transport block for a downlink shared channel (DL-SCH)) and/or downlink control data (downlink control information) and/or a downlink reference signal (DRS)). That is, this PDCCH can also be said to be a signal which performs resource allocation for a downlink (hereinafter, also referred to as "downlink transmission permission signal", "downlink grant").

Moreover, the mobile station apparatus 200, when resource allocation of PUSCH is transmitted on PDCCH addressed to its own apparatus, based on the resource allocation indicated by PDCCH from the base station apparatus 100, transmits using PUSCH an uplink signal (uplink data (transport block for an uplink shared channel (UL-SCH)) and/or uplink control data (uplink control information) and/or an uplink reference signal (URS)). That is, this PDCCH can also be said to be a signal which permits data transmission for an uplink (hereinafter, also referred to as "uplink transmission permission signal", "uplink grant").

PDSCH is a channel used for transmitting downlink data (a transport block for a downlink shared channel (DL-SCH)) or paging information (paging channel: PCH). The base station apparatus 100 transmits a downlink transport block (transport block for a downlink shared channel (DL-SCH)) to the mobile station apparatus 200 using PDSCH allocated by PDCCH.

Here, the downlink data indicates user data, for example, and DL-SCH is a transport channel. In DL-SCH, HARQ and dynamic adaptation radio link control are supported, and beam-forming can be used. In DL-SCH, dynamic resource allocation and semi-static resource allocation are supported. In addition, a system information block (SIB) is mapped on DL-SCH.

PUSCH is a channel mainly used for transmitting uplink data (transport block for an uplink shared channel (UL-SCH)). The mobile station apparatus 200 transmits an uplink transport block (transport block for an uplink shared channel (UL-SCH)) to the base station apparatus 100 using PUSCH allocated by PDCCH transmitted from the base station apparatus 100.

In addition, when the base station apparatus 100 schedules the mobile station apparatus 200, uplink control information is also transmitted using PUSCH. Here, in uplink control information, included are channel state information (CSI), and/or a channel quality identifier (CQI), and/or a precoding matrix indicator (PMI), and/or a rank indicator (RI). Furthermore, in uplink control information, included is information indicating ACK/NACK of HARQ for a downlink transport block. In addition, in uplink control information, included is a scheduling request (SR) requesting (requesting transmission in UL-SCH) allocation of resources for the mobile station apparatus 200 to transmit uplink data.

Here, the uplink data indicates user data, for example, and UL-SCH is a transport channel. In addition, PUSCH is a physical channel defined by (composed of) a time domain and a frequency domain. In UL-SCH, HARQ and dynamic adaptation radio link control are supported, and beam-forming can be used. In UL-SCH, dynamic resource allocation and semi-static resource allocation are supported.

In addition, in uplink data (UL-SCH) and downlink data (DL-SCH), a radio resource control signal (hereinafter, referred to as "RRC signaling: Radio Resource Control Signaling") exchanged between the base station apparatus 100 and the mobile station apparatus 200 may be included. Moreover, in uplink data (UL-SCH) and downlink data (DL-SCH), a MAC (Medium Access Control) control element exchanged between the base station apparatus 100 and the mobile station apparatus 200 may be included.

The base station apparatus 100 and the mobile station apparatus 200 transmit and receive the RRC signaling in a higher layer (Radio Resource Control layer). In addition, the base station apparatus 100 and the mobile station apparatus 200 transmit and receive the MAC control element in a higher layer (Medium Access Control (MAC) layer).

PUCCH is a channel used for transmitting uplink control information. Here, in uplink control information, included are channel state information (CSI), and/or a channel quality identifier (CQI), and/or a precoding matrix indicator (PMI), and/or a rank indicator (RI). In addition, in uplink control information, included is information indicating ACK/NACK of HARQ for a downlink transport block. In addition, in uplink control information, included is a scheduling request (SR) requesting (requesting transmission in UL-SCH) allocation of resources for the mobile station apparatus 200 to transmit uplink data.

[Configuration of Base Station Apparatus 100]

Figure 2:
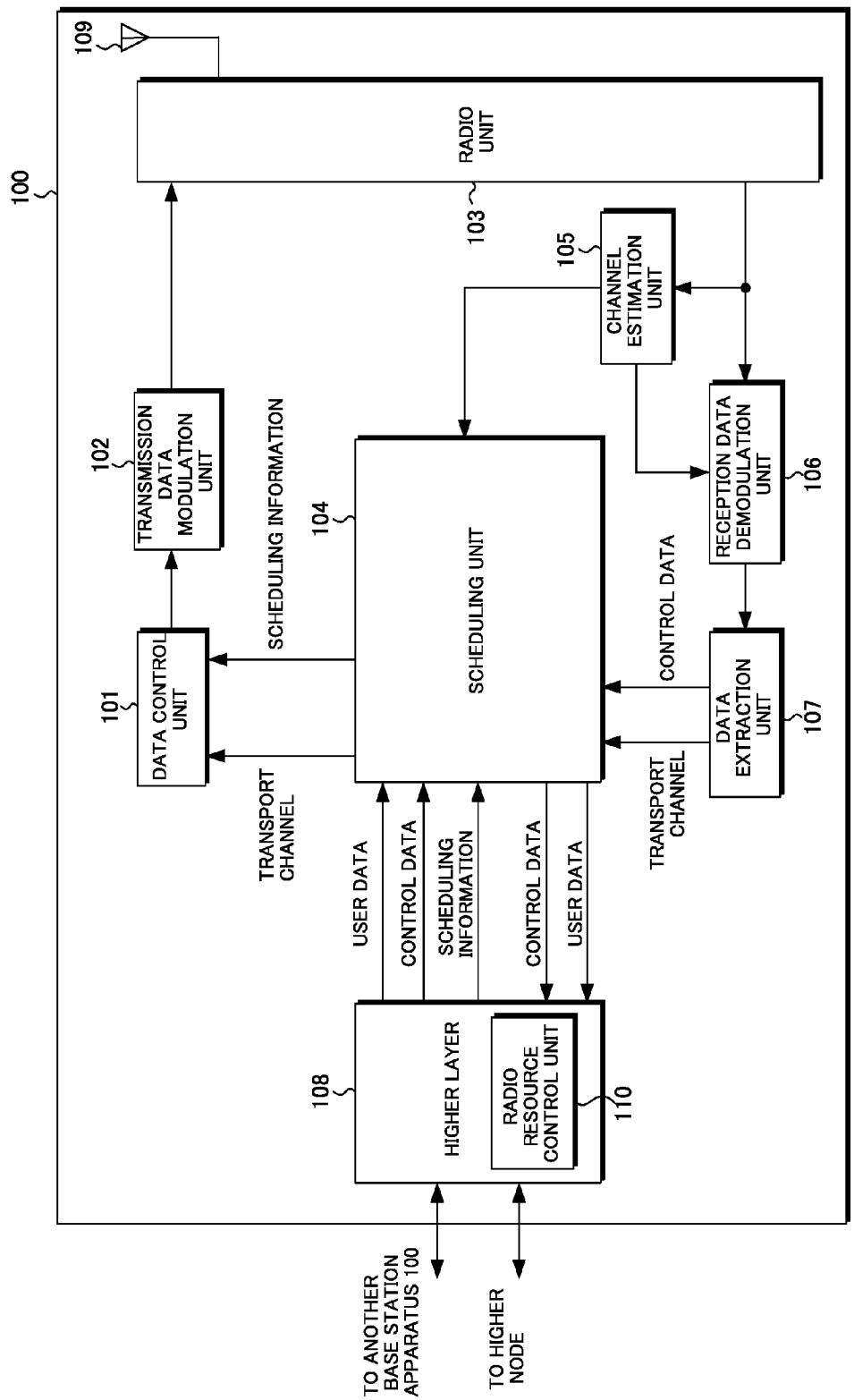
FIG. 2 is a block diagram showing a schematic configuration of a base station apparatus according to an embodiment of the present invention.

FIG. 2 is a block diagram showing a schematic configuration of a base station apparatus 100 according to an embodiment of the present invention. The base station apparatus 100 is comprised of a data control unit 101, a transmission data modulation unit 102, a radio unit 103, a scheduling unit 104, a channel estimation unit 105, a reception data demodulation unit 106, a data extraction unit 107, a higher layer 108, and an antenna 109. In addition, the radio unit 103, the scheduling unit 104, the channel estimation unit 105, the reception data demodulation unit 106, the data extraction unit 107, the higher layer 108, and the antenna 109 constitute a reception unit (base station side reception unit), and the data control unit 101, the transmission data modulation unit 102, the radio unit 103, the scheduling unit 104, the higher layer 108, and the antenna 109 constitute a transmission unit (base station side transmission unit).

The antenna 109, the radio unit 103, the channel estimation unit 105, the reception data demodulation unit 106, and the data extraction unit 107 perform processing of an uplink physical layer. The antenna 109, the radio unit 103, the transmission data modulation unit 102, and the data control unit 101 perform processing of a downlink physical layer.

The data control unit 101 receives a transport channel from the scheduling unit 104. The data control unit 101 maps the transport channel, and a signal and channel which are generated in a physical layer to a physical channel based on scheduling information input from the scheduling unit 104. Each piece of data mapped as described above is output to the transmission data modulation unit 102.

The transmission data modulation unit 102 modulates transmission data into an OFDM system. The transmission data modulation unit 102, on data input from the data control unit 101, based on scheduling information from the scheduling unit 104, and/or a modulation scheme and coding scheme corresponding to each PRB, performs signal processing such as data modulation, coding, serial/parallel conversion of an input signal, an IFFT (Inverse Fast Fourier Transform) process, CP (Cyclic Prefix) insertion, and filtering, to generate transmission data, and outputs it to the radio unit 103. Here, in scheduling information, included is downlink physical resource block PRB allocation information, for example, physical resource block position information comprised of frequency and time, and in a modulation scheme and coding scheme corresponding to each PRB, for example, included is information such as a modulation scheme: 16 QAM or a coding rate: 2/3 coding rate.

The radio unit 103 up-converts modulation data input from the transmission data modulation unit 102 to a radio frequency to generate a radio signal, and transmits it to the mobile station apparatus 200 via the antenna 109. In addition, the radio unit 103 receives via the antenna 109 an uplink radio signal from the mobile station apparatus 200, and down-converts it to a baseband signal, and outputs the received data to the channel estimation unit 105 and the reception data demodulation unit 106.

The scheduling unit 104 performs processing of the Medium Access Control (MAC) layer. The scheduling unit 104 performs mapping between a logical channel and a transport channel, scheduling (HARQ processing, selection of a transport format, or the like) of a downlink and uplink, and the like. As for the scheduling unit 104, for integrating and controlling a processing unit of each physical layer, an interface exists between the scheduling unit 104 and each of the antenna 109, the radio unit 103, the channel estimation unit 105, the reception data demodulation unit 106, the data control unit 101, the transmission data modulation unit 102, and the data extraction unit 107 (however, not shown).

The scheduling unit 104, in downlink scheduling, based on uplink control information (CSI, CQI, PMI, RI, and/or information indicating ACK/NACK for a downlink transport block, a scheduling request or the like) received from the mobile station apparatus 200, and/or information on available PRB of each mobile station apparatus 200, a buffer status, and/or scheduling information input from the higher layer 108 or the like, performs selection processing of downlink transport format (transmission mode, i.e., an allocation of a physical resource block, a modulation scheme, a coding scheme and the like) for modulating each piece of data, and re-transmission control in HARQ and generation of scheduling information used for a downlink. These pieces of scheduling information used for the downlink scheduling are output to the data control unit 101.

Moreover, the scheduling unit 104, in the scheduling of an uplink, based on an estimation result of an uplink channel state (radio channel state) which the channel estimation unit 105 outputs, a resource allocation request from the mobile station apparatus 200, information on the available PRB of each mobile station apparatus 200, scheduling information input from the higher layer 108, and the like, performs selection processing of uplink transport format for modulating each piece of data (transmission mode, i.e., an allocation of a physical resource block, a modulation scheme, an encoding scheme and the like) and generation of scheduling information used for a uplink scheduling. These pieces of scheduling information used for the uplink scheduling are output to the data control unit 101.

In addition, the scheduling unit 104 maps a downlink logical channel input from the higher layer 108 to a transport channel, and outputs it to the data control unit 101. Furthermore, the scheduling unit 104 maps control data and a transport channel acquired in an uplink input from the data extraction unit 107 to an uplink logical channel after performing processing as necessary, and outputs it to the higher layer 108.

The channel estimation unit 105 estimates, for demodulating uplink data, an uplink channel state from an Uplink Demodulation Reference Signal (UDRS), and outputs the estimation result to the reception data demodulation unit 106. In addition, for performing scheduling of an uplink, the channel estimation unit 105 estimates an uplink channel state from an uplink Sounding Reference Signal (SRS), and outputs the estimation result to the scheduling unit 104.

The reception data demodulation unit 106 doubles as an OFDM demodulation unit and/or a DFT-Spread-OFDM (DFT-S-OFDM) demodulation unit which demodulate received data modulated into an OFDM system and/or an SC-FDMA system. The reception data demodulation unit 106, based on an uplink channel state estimation result input from the channel estimation unit 105, on modulation data input from the radio unit 103, performs signal processing such as DFT conversion, subcarrier mapping, IFFT conversion, and filtering, and performs demodulation processing to output the demodulated data to the data extraction unit 107.

The data extraction unit 107 confirms whether data input from the reception data demodulation unit 106 is correct or not, and outputs the confirmation result (ACK or NACK) to the scheduling unit 104. Furthermore, the data extraction unit 107 separates data input from the reception data demodulation unit 106 into a transport channel and control data of a physical layer, and outputs them to the scheduling unit 104. In the separated control data, included are CSI, CQI, PMI, and RI transmitted from the mobile station apparatus 200, and/or information indicating ACK/NACK for a downlink transport block, and/or a scheduling request and the like.

The higher layer 108 performs processing of a Packet Data Convergence Protocol (PDCP) layer, a Radio Link Control (RLC) layer, and the Radio Resource Control (RRC) layer. As for the higher layer 108, for integrating and controlling a processing unit of a lower layer, an interface exists between the higher layer 108 and each of the scheduling unit 104, the antenna 109, the radio unit 103, the channel estimation unit 105, the reception data demodulation unit 106, the data control unit 101, the transmission data modulation unit 102, and the data extraction unit 107 (however, not shown).

The higher layer 108 has a radio resource control unit 110 (also referred to as a control unit). In addition, the radio resource control unit 110 performs management of various setting information, management of system information, paging control, management of a communication state of each mobile station apparatus 200, mobility management such as hand-over, management of a buffer status for every mobile station apparatus 200, management of connection setting of a unicast and multicast bearer, management of a mobile station identifier (UEID), and the like. The higher layer 108 delivers and receives information to and from another base station apparatus 100, and information to and from an higher node.

[Configuration of Mobile Station Apparatus 200]

Figure 3:
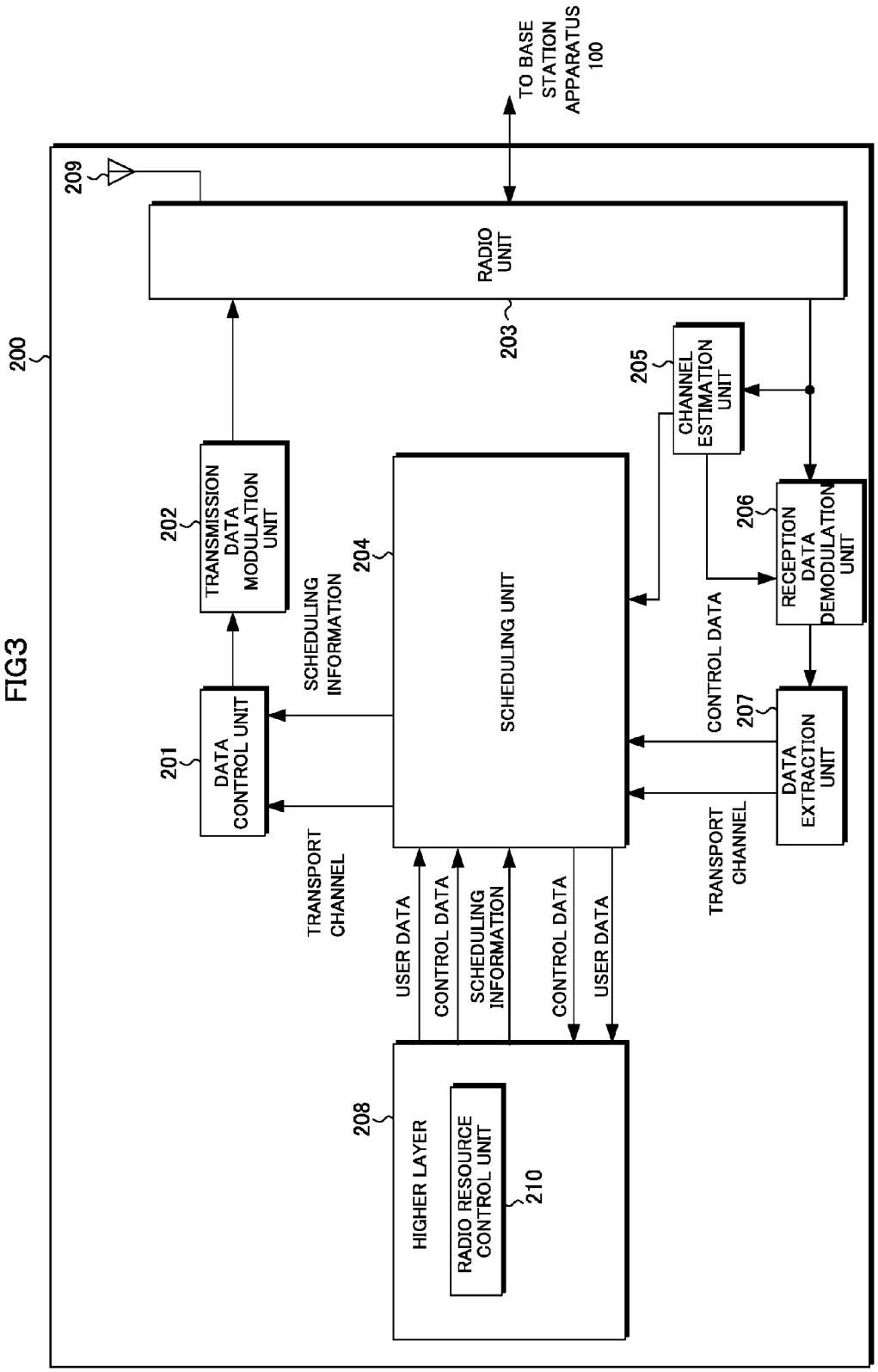
FIG. 3 is a block diagram showing a schematic configuration of a mobile station apparatus according to an embodiment of the present invention.

FIG. 3 is a block diagram showing a schematic configuration of a mobile station apparatus 200 according to an embodiment of the present invention. The mobile station apparatus 200 is comprised of: a data control unit 201; a transmission data modulation unit 202; a radio unit 203; a scheduling unit 204; a channel estimation unit 205; a reception data demodulation unit 206; a data extraction unit 207; an higher layer 208 and an antenna 209. Moreover, the data control unit 201, the transmission data modulation unit 202, the radio unit 203, the scheduling unit 204, the higher layer 208, and the antenna 209 constitute a transmission unit (mobile station side transmission unit), and the radio unit 203, the scheduling unit 204, the channel estimation unit 205, the reception data demodulation unit 206, the data extraction unit 207, the higher layer 208, and the antenna 209 constitute a reception unit (mobile station side reception unit).

The data control unit 201, the transmission data modulation unit 202, and the radio unit 203 perform processing of an uplink physical layer. The radio unit 203, the channel estimation unit 205, the reception data demodulation unit 206, and the data extraction unit 207 perform processing of a downlink physical layer.

The data control unit 201 receives a transport channel from the scheduling unit 204. The data control unit 201 maps the transport channel, and a signal and channel generated by a physical layer to a physical channel based on scheduling information input from the scheduling unit 204. Each piece of data mapped as mentioned above is output to the transmission data modulation unit 202.

The transmission data modulation unit 202 modulates transmission data into an OFDM system and/or an SC-FDMA system. The transmission data modulation unit 202, on data input from the data control unit 201, performs signal processing such as data modulation, DFT (discrete Fourier transform) processing, subcarrier mapping, IFFT (inverse fast Fourier transform) processing, CP insertion, and filtering to generate transmission data and outputs it to the radio unit 203.

The radio unit 203 up-converts modulation data input from the transmission data modulation unit 202 to a radio frequency to generate a radio signal, and transmits it to the base station apparatus 100 via the antenna 209. In addition, the radio unit 203 receives via the antenna 209 a radio signal modulated by downlink data from the base station apparatus 100, down-converts it into a baseband signal, and outputs the received data to the channel estimation unit 205 and the reception data demodulation unit 206.

The scheduling unit 204 performs processing of the Medium Access Control (MAC) layer. The scheduling unit 204 performs mapping between a logical channel and a transport channel, scheduling of a downlink and an uplink (HARQ processing, selection of a transport format, or the like), and the like. As for the scheduling unit 204, for integrating and controlling a processing unit of each physical layer, an interface exists between the scheduling unit 204 and each of the antenna 209, the data control unit 201, the transmission data modulation unit 202, the channel estimation unit 205, the reception data demodulation unit 206, the data extraction unit 207, and the radio unit 203 (however, not shown).

The scheduling unit 204, in scheduling of a downlink, based on scheduling information (a transport format and/or HARQ retransmission information) or the like from the base station apparatus 100 and/or the higher layer 208, performs reception control of a transport channel, a physical signal and a physical channel, HARQ re-transmission control, and generation of scheduling information used for scheduling of a downlink. These pieces of scheduling information used for the downlink scheduling are output to the data control unit 201.

The scheduling unit 204, in scheduling of an uplink, based on an uplink buffer status input from the higher layer 208, uplink scheduling information from the base station apparatus 100 input from the data extraction unit 207 (a transport format and/or HARQ retransmission information or the like), and scheduling information input from the higher layer 208 or the like, performs scheduling processing for mapping an uplink logical channel input from the higher layer 208 to a transport channel, and generation of scheduling information used for an uplink scheduling. Besides, with respect to an uplink transport format, information notified from the base station apparatus 100 is used. These pieces of scheduling information are output to the data control unit 201.

In addition, the scheduling unit 204 maps an uplink logical channel input from the higher layer 208 to a transport channel, and outputs it to the data control unit 201. Moreover, the scheduling unit 204 also outputs CSI, CQI, PMI, and/or RI which are input from the channel estimation unit 205, and a CRC check confirmation result input from the data extraction unit 207 to the data control unit 201. In addition, the scheduling unit 204 maps control data and a transport channel which are input from the data extraction unit 207 and acquired in a downlink to a downlink logical channel after processing as necessary, and outputs them to the higher layer 208.

The channel estimation unit 205, for demodulating downlink data, estimates a downlink channel state from a downlink reference signal, and outputs the estimation result to the reception data demodulation unit 206. In addition, the channel estimation unit 205, for notifying the base station apparatus 100 of the estimation result of a downlink channel state (radio channel state, CSI, CQI, PMI, RI), estimates a downlink channel state from a downlink reference signal, and outputs the estimation result to the scheduling unit 204 as CSI, CQI, PMI, and/or RI, for example.

The reception data demodulation unit 206 demodulates received data modulated into an OFDM system. The reception data demodulation unit 206, based on a downlink channel state estimation result input from the channel estimation unit 205, performs demodulation processing on modulation data input from the radio unit 203, and outputs the demodulated data to the data extraction unit 207.

The data extraction unit 207, while performing CRC check and confirming whether it is correct or incorrect on the data input from the reception data demodulation unit 206, outputs the confirmation result (information indicating ACK or NACK) to the scheduling unit 204. In addition, the data extraction unit 207 separates data input from the reception data demodulation unit 206 into a transport channel and control data of a physical layer, and outputs them to the scheduling unit 204. In the separated control data, included are scheduling information of a resource allocation of a downlink or an uplink, and/or HARQ control information of an uplink, or the like.

The higher layer 208 performs processing of a Packet Data Convergence Protocol (PDCP) layer, a Radio Link Control (RLC) layer, and the Radio Resource Control (RRC) layer. As for the higher layer 208, for integrating and controlling a processing unit of a lower layer, an interface exists between the higher layer 208 and each of the scheduling unit 204, the antenna 209, the data control unit 201, the transmission data modulation unit 202, the channel estimation unit 205, the reception data demodulation unit 206, the data extraction unit 207, and the radio unit 203 (however, not shown).

The higher layer 208 has a radio resource control unit 210 (also referred to as a control unit). The radio resource control unit 210 performs management of various configuring information, management of system information, paging control, management of a communication state of a self station, mobility management such as hand-over, management of a buffer status, management of a connection setting of a unicast and multicast bearer, management of a mobile station identifier (UEID).

First Embodiment

Then, the present embodiment in a mobile communication system using the base station apparatus 100 and the mobile station apparatus 200 will be described. In the present embodiment, the base station apparatus 100 notifies the mobile station apparatus 200 of a DCI format which schedules PUSCH, and the mobile station apparatus 200, when a transmission instruction of channel state information is included in the DCI format (for example, when a CSI request included in the DCI format is set to "1"), changes an interpretation for information mapped to a certain specific field in the DCI format, and generates channel state information for one or more downlink component carriers indicated by the information of which interpretation has been changed. That is, the base station apparatus 100 notifies the mobile station apparatus 200 of a DCI format which schedules PUSCH, and the mobile station apparatus 200, when a transmission instruction of channel state information is included in the DCI format (for example, when a CSI request included in the DCI format is set to "1"), changes an interpretation for information mapped to a certain specific field in the DCI format, and generates channel state information for the one or more downlink component carriers indicated by a value set in a certain specific field.

Here, when in information mapped to a certain specific field, a transmission instruction of channel state information is not included in a DCI format (for example, when a CSI request included in the DCI format is set to "0"), information interpreted as the information for indicating an uplink component carrier where PUSCH scheduled by a DCI format is mapped may be included.

In addition, the mobile station apparatus 200 maps the generated channel state information to PUSCH mapped on the uplink component carrier corresponding to the downlink component carrier where PDCCH for a DCI format including a transmission instruction of channel state information has been mapped, and transmits it to the base station apparatus 100.

Moreover, the base station apparatus 100 configures a correspondence between a downlink component carrier and an uplink component carrier in a Cell specific manner in the mobile station apparatus 200 using broadcast information (for example, SIB: System Information Block). In addition, the base station apparatus 100 may configure a correspondence between a downlink component carrier and an uplink component carrier in a mobile station apparatus specific (UE specific) manner using the RRC signaling.

Hereinafter, in the present embodiment, a frequency band is defined based on a bandwidth (Hz), but, may be defined based on the number of resource blocks (RB) composed of a frequency and time. That is, the bandwidth may be defined based on the number of resource blocks. In addition, the bandwidth and the number of resource blocks can also be defined based on the number of subcarriers.

The component carrier in the present embodiment, in the mobile communication system having a wider frequency band (may be a system band), refers to a (narrow) frequency band used complexly when the base station apparatus 100 and the mobile station apparatus 200 perform communication. The base station apparatus 100 and the mobile station apparatus 200 configure a wider frequency band (for example, frequency band having a bandwidth of 100 MHz) by aggregating a plurality of component carriers (for example, five component carriers each having a bandwidth of 20 MHz), and can realize high-speed data communication (transmission/reception of information) by using complexly these plurality of component carriers.

The component carrier refers to each of (narrow) frequency bands (for example, a frequency band having a bandwidth of 20 MHz) which constitutes the wider frequency band (for example, a frequency band having a bandwidth of 100 MHz). In addition, the component carrier may indicate each a (center) carrier frequency of this (narrow) frequency band. That is, the downlink component carrier has a part of band (width) within a frequency band which is available when the base station apparatus 100 and the mobile station apparatus 200 perform transmission/reception of downlink information, and the uplink component carrier has a part of band (width) within a frequency band which is available when the base station apparatus 100 and the mobile station apparatus 200 perform transmission/reception of uplink information. Furthermore, the component carrier may be defined as a unit which constitutes a certain specific physical channel (for example, PDCCH, PUCCH, or the like).

In addition, the component carrier may be mapped on a contiguous frequency band, or may be mapped on a non-contiguous frequency band, and the base station apparatus 100 and the mobile station apparatus 200 configure a wider frequency band by aggregating a plurality of component carriers that is contiguous and/or non-contiguous frequency bands, and can realize high-speed data communication (transmission/reception of information) by using complexly these plurality of component carriers.

Furthermore, a frequency band used for downlink communication and a frequency band used for uplink communication which are composed of component carriers are not necessary to have the same bandwidth, and the base station apparatus 100 and the mobile station apparatus 200 can perform communication by using complexly a downlink frequency band and uplink frequency band which have a different bandwidth composed of the component carriers (asymmetric frequency band aggregation mentioned above: Asymmetric carrier aggregation).

Figure 4:
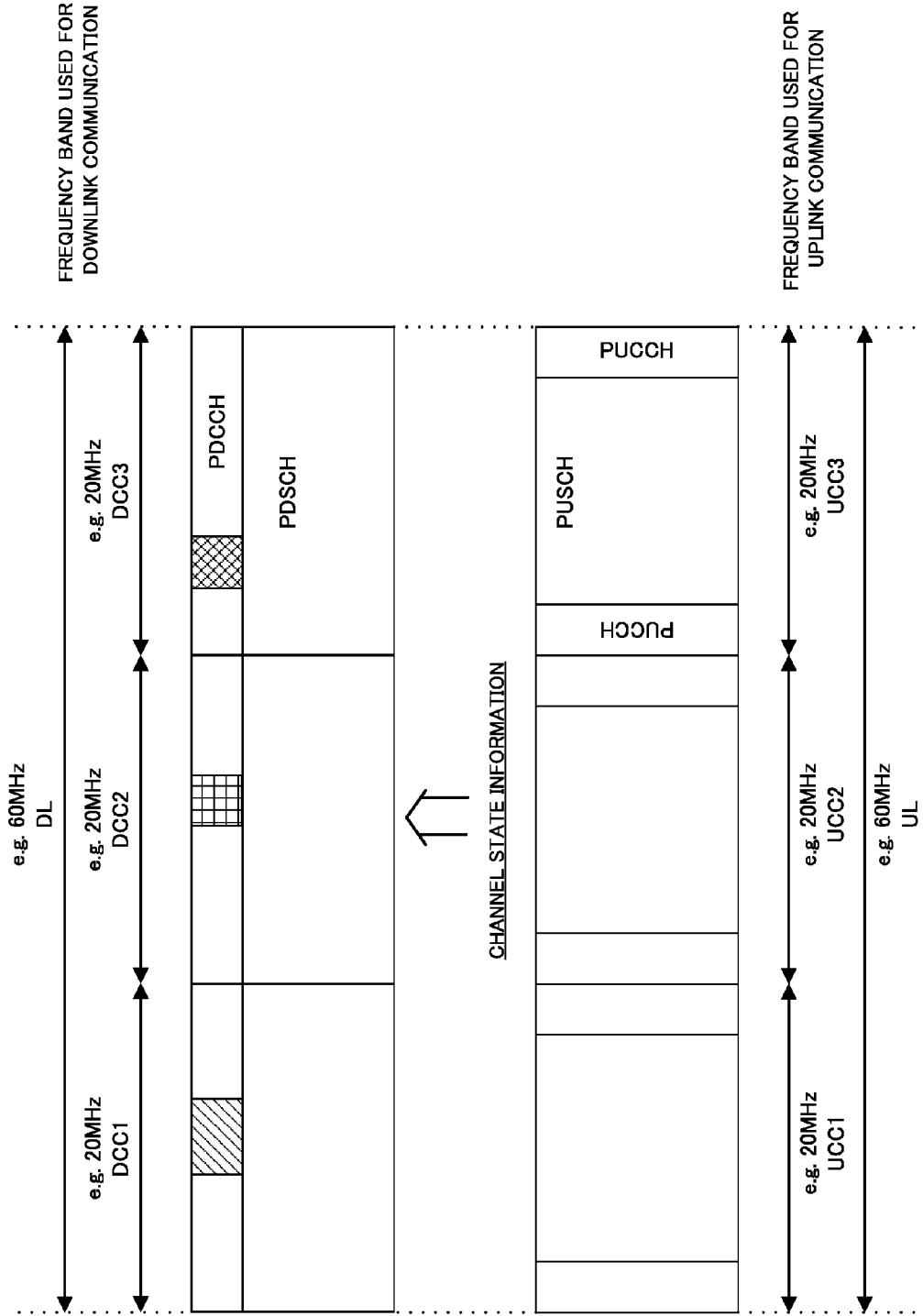
FIG. 4 is a figure showing an example of a mobile communication system to which an embodiment of the present invention can be applied.
Figure 6:
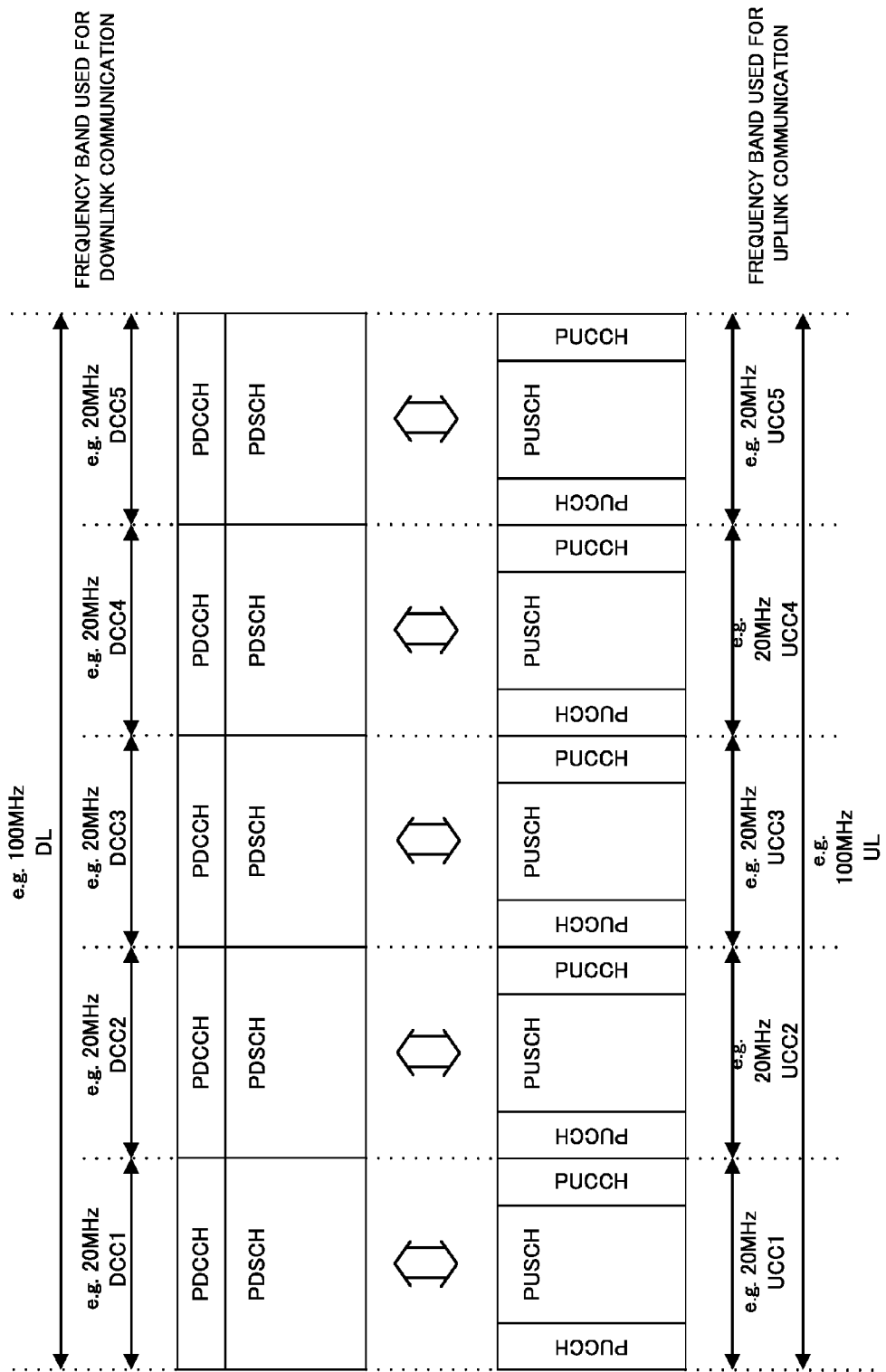
FIG. 6 is a figure showing an example of frequency band aggregation in a conventional technology.
Figure 7:
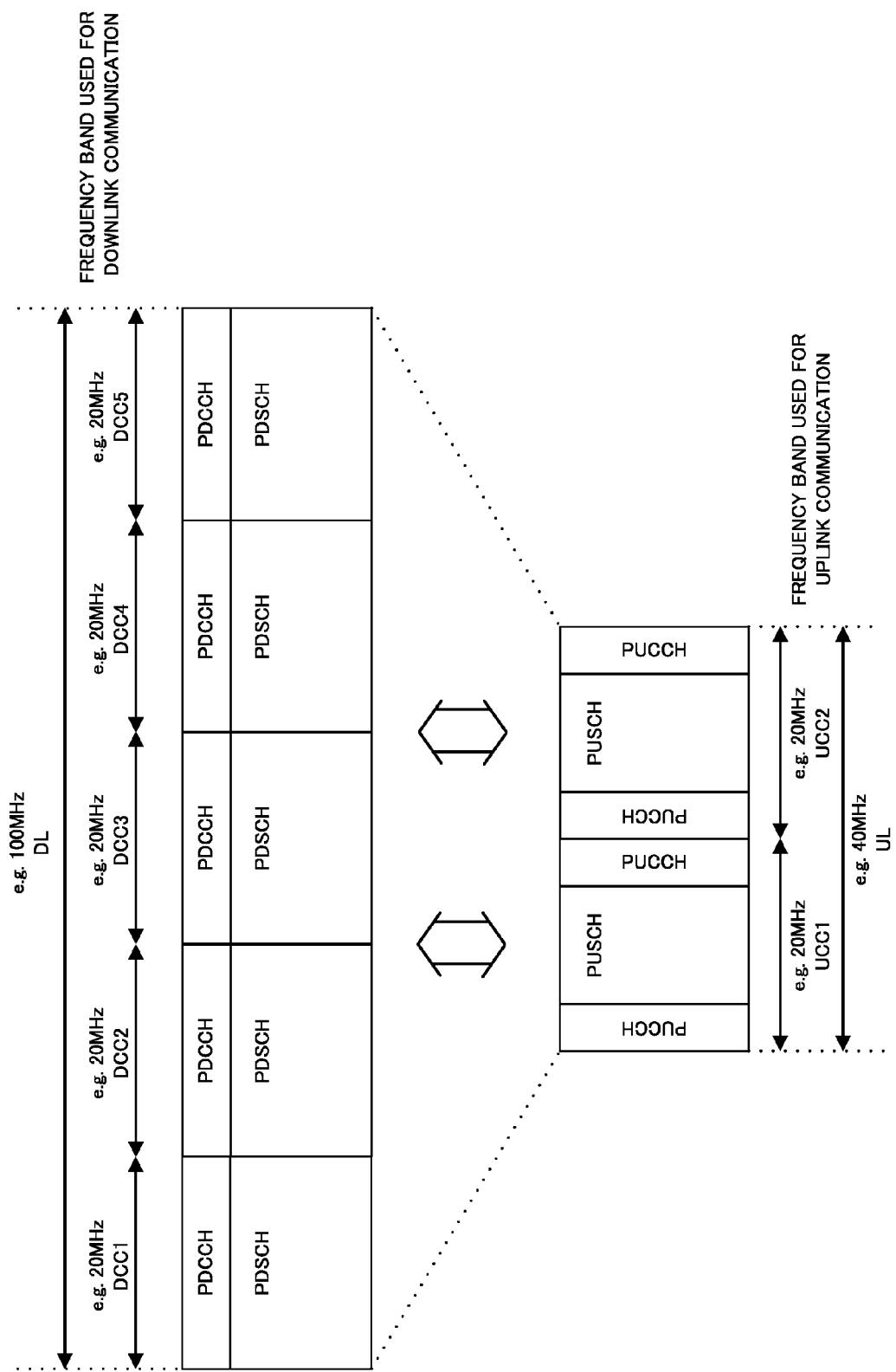
FIG. 7 is a figure showing an example of an asymmetric frequency band aggregation in a conventional technology.
Figure 8:
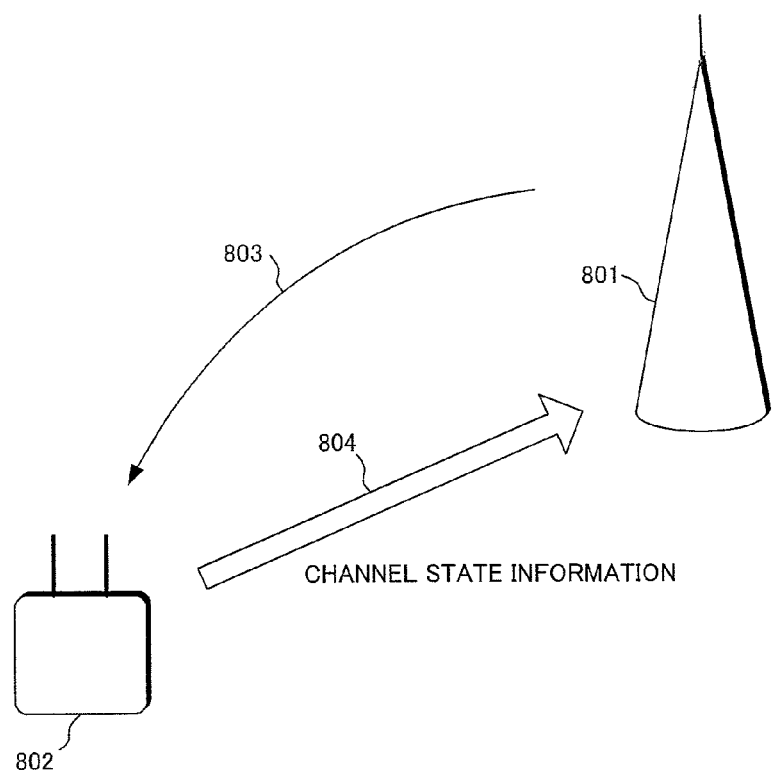
FIG. 8 is a figure showing an example of transmission of channel state information in a conventional technology.

FIG. 4 is a figure showing an example of a mobile communication system to which the present embodiment can be applied. FIG. 4 shows that as an example by which the present embodiment will be described, a frequency band used for downlink communication having a bandwidth of 60 MHz is composed of three downlink component carriers (DCC1, DCC2, and DCC3) which each has a bandwidth of 20 MHz. In addition, FIG. 4 shows that as an example, a frequency band used for uplink communication having a bandwidth of 60 MHz is composed of three uplink component carriers (UCC1, UCC2, and UCC3) which each has a bandwidth of 20 MHz. In FIG. 4, downlink/uplink channels are mapped on downlink/uplink component carriers, respectively.

Hereinafter, as the present embodiment, the mobile communication system as shown in FIG. 4 will be described, but, as a matter of course, the present embodiment can be applied to a mobile communication system of any of a symmetrical frequency band aggregation and an asymmetric frequency band aggregation. In addition, in the present embodiment, for simplicity, channel state information (CSI) will be described, but, as a matter of course, the present embodiment can be applied also to a channel quality identifier (CQI), and/or a precoding matrix indicator (PMI), and/or a rank indicator (RI).

In FIG. 4, the base station apparatus 100 allocates (schedules) (one or more of) PDSCHs in the same subframe using (one or more of) PDCCHs mapped on a downlink component carrier. That is, the base station apparatus 100 can notify the mobile station apparatus 200 of (one or more of) DCI formats where (one or more of) PDSCHs are allocated in the same subframe.

Here, the base station apparatus 100 can allocate PDSCH mapped on the same downlink component carrier as the downlink component carrier where PDCCH is mapped. That is, the base station apparatus 100 can schedule PDSCH mapped on the same downlink component carrier as the downlink component carrier where PDCCH for a DCI format which schedules PDSCHs is mapped.

For example, in FIG. 4, the base station apparatus 100 can allocate PDSCH mapped on DCC1 using PDCCH mapped on DCC1 (PDCCH hatched with a slash). In addition, for example, the base station apparatus 100 can allocate PDSCH mapped on DCC2 using PDCCH mapped on DCC2 (PDCCH indicated with a grid line). Moreover, for example, the base station apparatus 100 can allocate PDSCH mapped on DCC3 using PDCCH mapped on DCC3 (PDCCH hatched with a mesh).

In addition, the base station apparatus 100 can allocate PDSCH mapped on the same or different downlink component carrier as or from the downlink component carrier where PDCCH is mapped. Moreover, the base station apparatus 100 can allocate PDSCH mapped on the same or different downlink component carrier as or from the downlink component carrier where PDCCH for a DCI format which schedules PDSCH is mapped.

For example, the base station apparatus 100 transmits a Component carrier Indicator Field (CIF, for example, information field expressed with 3 bits) on PDCCH which allocates PDSCH to the mobile station apparatus 200, and thereby, can indicate the downlink component carrier where PDSCH allocated by PDCCH is mapped for the mobile station apparatus 200. That is, the base station apparatus 100 transmits a component carrier indicator field on PDCCH which allocates PDSCH to the mobile station apparatus 200, and can indicate to the mobile station apparatus 200 that PDSCH mapped on which downlink component carrier has been allocated by PDCCH.

For example, in FIG. 4, the base station apparatus 100 can allocate PDSCH mapped on DCC2 using PDCCH (PDCCH hatched with a slash) mapped on DCC1. In addition, for example, the base station apparatus 100 can allocate PDSCH mapped on DCC1 using PDCCH (PDCCH hatched with a grid line) mapped on DCC2. Moreover, for example, the base station apparatus 100 can allocate PDSCH mapped on DCC3 using PDCCH (PDCCH indicated with a mesh) mapped on DCC3.

Here, it is configured in the mobile station apparatus 200 by the base station apparatus 100 using, for example, the RRC signaling that when the component carrier indicator field included in PDCCH transmitted from the base station apparatus 100 indicates which value, PDSCH mapped on which downlink component carrier has been allocated.

In addition, it may be defined by a specification or the like in advance that when the component carrier indicator field included in PDCCH transmitted from the base station apparatus 100 indicates which value, PDSCH mapped on which downlink component carrier has been allocated.

That is, information (set value) mapped to the component carrier indicator field included in PDCCH (DCI format) which schedules PDSCH is used as information (value) indicating the downlink component carrier where PDSCH scheduled by PDCCH (DCI format) is mapped (interpreted between the base station apparatus 100 and the mobile station apparatus 200).

Moreover, in FIG. 4, the base station apparatus 100 allocates (schedules) (one or more of) PDSCHs in the same subframe using (one or more of) PDCCHs. That is, the base station apparatus 100 can notify the mobile station apparatus 200 of (one or more of) DCI formats where (one or more of) PDSCHs are allocated in the same subframe.

Here, the base station apparatus 100 can allocate PUSCH mapped on an uplink component carrier corresponding (linking) to the downlink component carrier where PDCCH has been mapped. That is, the base station apparatus 100 can schedule PUSCH mapped on the uplink component carrier corresponding (linking) to the downlink component carrier where PDCCH for a DCI format which schedules PUSCH has been mapped.

For example, in FIG. 4, the base station apparatus 100 can allocate PUSCH mapped on UCC1 using PDCCH (PDCCH hatched with a slash) mapped on DCC1. Moreover, for example, in FIG. 4, the base station apparatus 100 can allocate PUSCH mapped on UCC2 using PDCCH (PDCCH hatched with a grid line) mapped on DCC2. In addition, for example, the base station apparatus 100 can allocate PUSCH mapped on UCC3 using PDCCH (PDCCH indicated with a mesh) mapped on DCC3.

Here, the base station apparatus 100 can configure a correspondence between the downlink component carrier and the uplink component carrier in the mobile station apparatus 200. That is, the base station apparatus 100 can configure a correspondence between the downlink component carrier where PDCCH has been mapped and the uplink component carrier where PUSCH scheduled by PDCCH is mapped in the mobile station apparatus 200. That is, the base station apparatus 100 can configure, in the mobile station apparatus 200, an uplink component carrier corresponding to the downlink component carrier where PDCCH for a DCI format which schedules PUSCH has been mapped.

For example, the base station apparatus 100 can configure, in the mobile station apparatus 200, a correspondence between the downlink component carrier and the uplink component carrier using broadcast information (for example, SIB: System Information Block). That is, the base station apparatus 100 can configure, in the mobile station apparatus 200 in a cell specific manner, a correspondence between the downlink component carrier and the uplink component carrier.

In addition, for example, the base station apparatus 100 can configure, in the mobile station apparatus 200 using the RRC signaling, a correspondence between the downlink component carrier and the uplink component carrier. That is, the base station apparatus 100 can configure, in the mobile station apparatus 200 in a mobile station apparatus specific (UE specific) manner, a correspondence between the downlink component carrier and the uplink component carrier.

In FIG. 4, as an example, it is shown that the base station apparatus 100 makes DCC1 and UCC1 correspond to each other in a cell specific manner or a mobile station apparatus specific manner for the mobile station apparatus 200. In addition, it is shown that the base station apparatus 100 makes DCC2 and UCC2 correspond to each other in a cell specific manner or a mobile station apparatus specific manner for the mobile station apparatus 200. Moreover, it is shown that the base station apparatus 100 makes DCC3 and UCC3 correspond to each other in a cell specific manner or a mobile station apparatus specific manner for the mobile station apparatus 200.

In addition, the base station apparatus 100, by transmitting a Component carrier Indicator Field (CIF, for example, information field expressed with 3 bits) on PDCCH which allocates PUSCH to the mobile station apparatus 200, can indicate, for the mobile station apparatus 200, the uplink component carrier where PUSCH allocated by using PDCCH is mapped. That is, the base station apparatus 100 transmits the component carrier indicator field on PDCCH which allocates PDSCH to the mobile station apparatus 200, and can indicate to the mobile station apparatus 200 by PDCCH that PUSCH mapped on which uplink component carrier has been allocated.

For example, in FIG. 4, the base station apparatus 100 can allocate PUSCH mapped on UCC2 using PDCCH (PDCCH hatched with a slash) mapped on DCC1. In addition, for example, the base station apparatus 100 can allocate PUSCH mapped on UCC1 using PDCCH (PDCCH hatched with a grid line) mapped on DCC2. In addition, for example, the base station apparatus 100 can allocate PUSCH mapped on UCC3 using PDCCH (PDCCH indicated with a mesh) mapped on DCC3.

Here, it is configured in the mobile station apparatus 200 by the base station apparatus 100 using the RRC signaling, for example, that when the component carrier indicator field included in PDCCH transmitted from the base station apparatus 100 indicates which value, PUSCH mapped on which uplink component carrier has been allocated.

In addition, it may be defined by a specification or the like in advance that when the component carrier indicator field included in PDCCH transmitted from the base station apparatus 100 indicates which value, PDSCH mapped on which uplink component carrier has been allocated.

That is, the information (set value) mapped to the component carrier indicator field included in PDCCH (DCI format) which schedules PUSCH is used as the information (value) indicating the uplink component carrier where PUSCH scheduled by PDCCH (DCI format) has been mapped (interpreted between the base station apparatus 100 and the mobile station apparatus 200).

Here, for example, as mentioned later, when the base station apparatus 100 does not include a transmission instruction of channel state information in a DCI format which schedules PUSCH, the base station apparatus 100 and the mobile station apparatus 200 can interpret the information mapped to this field as the information indicating the uplink component carrier where PUSCH scheduled by DCI format has been mapped.

In addition, in FIG. 4, the base station apparatus 100 can configure, in the mobile station apparatus 200, a certain specific (for example, one) downlink component carrier from among a plurality of downlink component carriers. Hereinafter, a certain specific downlink component carrier configured by the base station apparatus 100 is also described as a primary downlink component carrier.

For example, the base station apparatus 100 can configure the primary downlink component carrier in the mobile station apparatus 200 using broadcast information. In addition, for example, the base station apparatus 100 can configure the primary downlink component carrier in the mobile station apparatus 200 using the RRC signaling. Hereinafter, a downlink component carrier other than the certain specific downlink component carrier, which is configured by the base station apparatus 100, is also described as a secondary downlink component carrier.

In addition, the base station apparatus 100 can configure, in the mobile station apparatus 200, a certain specific (for example, one) uplink component carrier from among a plurality of uplink component carriers. Hereinafter, a certain specific uplink component carrier configured by the base station apparatus 100 is also described as a primary uplink component carrier.

For example, the base station apparatus 100 can configure the primary uplink component carrier in the mobile station apparatus 200 using broadcast information. In addition, for example, the base station apparatus 100 can configure the primary uplink component carrier in the mobile station apparatus 200 using the RRC signaling. Hereinafter, an uplink component carrier other than the certain specific uplink component carrier, which is configured by the base station apparatus 100, is also described as a secondary uplink component carrier.

Furthermore, the base station apparatus 100 can configure, in the mobile station apparatus 200, the primary uplink component carrier as the uplink component carrier corresponding to the primary downlink component carrier. That is, the base station apparatus 100 configures the primary downlink component carrier in the mobile station apparatus 200, and the mobile station apparatus 200 can recognize the uplink component carrier corresponding to the primary downlink component carrier as the primary uplink component carrier.

As mentioned above, the base station apparatus 100 can allocate, to the mobile station apparatus 200, PDSCH mapped on the primary downlink component carrier using PDCCH mapped on the primary downlink component carrier. In addition, the base station apparatus 100 can allocate, to the mobile station apparatus 200, PDSCH mapped on the secondary downlink component carrier using PDCCH mapped on the primary downlink component carrier.

Moreover, as mentioned above, the base station apparatus 100 can allocate, to the mobile station apparatus 200, PUSCH mapped on the primary uplink component carrier corresponding to the primary downlink component carrier using PDCCH mapped on the primary downlink component carrier. In addition, the base station apparatus 100 can allocate, to the mobile station apparatus 200, PDSCH mapped on the secondary downlink component carrier using PDCCH mapped on the primary downlink component carrier.

In FIG. 4, the base station apparatus 100 transmits downlink data to the mobile station apparatus 200 using PDSCH allocated by PDCCH. For example, the base station apparatus 100 can transmit (up to three pieces of) downlink data to the mobile station apparatus 200 in the same subframe using PDSCH allocated by each of PDCCHs mapped on DCC1, DCC2, and DCC3.

In addition, the mobile station apparatus 200 transmits uplink data, to the base station apparatus 100, using PUSCH allocated by PDCCH transmitted from the base station apparatus 100. For example, the mobile station apparatus 200 can transmit (up to three pieces of) uplink data to the base station apparatus 100 in the same subframe using PUSCHs mapped on UCC1, DCC2, and UCC3.

Moreover, in FIG. 4, the base station apparatus 100, by including a transmission instruction (transmission request) of channel state information in a DCI format (PDCCH) which schedules PUSCH to notify it to the mobile station apparatus 200, can instruct (request) the mobile station apparatus 200 to transmit the channel state information. For example, the base station apparatus 100 can instruct the mobile station apparatus 200 to transmit the channel state information by setting to "1" a CSI request included in a DCI format which schedules PUSCH to notify it to the mobile station apparatus 200.

Hereinafter, that the base station apparatus 100 includes a transmission instruction of channel state information in a DCI format which schedules PUSCH to notify it to the mobile station apparatus 200, is also simply described as that the base station apparatus 100 includes the transmission instruction of channel state information in the DCI format to notify it to the mobile station apparatus 200. In addition, it is also described as notifying the mobile station apparatus 200 with the CSI request set to "1" that the base station apparatus 100 instructs the mobile station apparatus 200 of transmission of the channel state information. Moreover, it is also described as notifying the mobile station apparatus 200 of the CSI request set to "0" that the base station apparatus 100 does not instruct the mobile station apparatus 200 to transmit the channel state information.

That the base station apparatus 100 has not instructed the mobile station apparatus 200 to transmit the channel state information, for example, is to instruct the mobile station apparatus 200 to transmit on PUSCH without the channel state information being mapped to PUSCH. For example, the base station apparatus 100, by notifying the mobile station apparatus 200 of the CSI request set to "0", can instruct the mobile station apparatus 200 to map uplink data to PUSCH and transmit it to the base station apparatus 100.

The mobile station apparatus 200, when a transmission instruction of channel state information is included in the DCI format notified from the base station apparatus 100, transmits the channel state information to the base station apparatus 100. At this time, the mobile station apparatus 200 maps the channel state information to PUSCH scheduled by the DCI format, and transmits it to the base station apparatus 100.

Here, that the mobile station apparatus 200 transmits the channel state information to the base station apparatus 100 based on a transmission instruction of channel state information included in the DCI format, is also referred to as transmission of an Aperiodic channel state information (A-CSI) by the mobile station apparatus 200. The base station apparatus 100, by including a transmission instruction of channel state information in a DCI format to notify it to the mobile station apparatus 200, can instruct the mobile station apparatus 200 to transmit the channel state information dynamically (for example, for every 1 ms).

In FIG. 4, the base station apparatus 100 includes a transmission instruction of channel state information in a DCI format which schedules PUSCH to transmit it to the mobile station apparatus 200, and the mobile station apparatus 200 which has been notified of this DCI format maps the channel state information to PUSCH scheduled by the DCI format, and transmits it to the base station apparatus 100.

At this time, the mobile station apparatus 200, when uplink data need to be transmitted (when uplink data exist in a buffer), maps the channel state information and the uplink data to PUSCH scheduled by the base station apparatus 100, and transmits it to the base station apparatus 100. In addition, at this time, the mobile station apparatus 200, when information indicating ACK/NACK for the downlink data needs to be transmitted, maps the information indicating channel state information and ACK/NACK to PUSCH scheduled by the base station apparatus 100, and transmits it to the base station apparatus 100.

Here, the mobile station apparatus 200 maps channel state information generated (measured) for any of downlink signals transmitted for every downlink component carrier to PUSCH scheduled by the base station apparatus 100, and transmits it to the base station apparatus 100. For example, in FIG. 4, the mobile station apparatus 200 generates channel state information for any of downlink signals transmitted for each of DCC1, DCC2 and DCC3, and can transmit the generated channel state information to the base station apparatus 100.

That is, the mobile station apparatus 200 can map channel state information for the downlink signal transmitted on DCC1 to PUSCH scheduled by the base station apparatus 100 to transmit it to the base station apparatus 100. In addition, the mobile station apparatus 200 can map channel state information for the downlink signal transmitted on DCC2 to PUSCH scheduled by the base station apparatus 100 to transmit it to the base station apparatus 100. The mobile station apparatus 200 can map channel state information for the downlink signal transmitted on DCC3 to PUSCH scheduled by the base station apparatus 100 to transmit it to the base station apparatus 100.

Here, the base station apparatus 100 can instruct the mobile station apparatus 200 to generate (measure) the channel state information for the downlink signal(s) transmitted on which the downlink component carrier(s) using the information included in the DCI format (PDCCH). That is, the base station apparatus 100 can instruct the mobile station apparatus 200 of one or more downlink component carriers to be a generation (measurement) object of channel state information (hereinafter, also referred to as one or more downlink component carriers for generating channel state information) using information included in the DCI format (PDCCH).

At this time, an indication of one or more downlink component carriers for generating channel state information by the base station apparatus 100 can be realized by changing interpretation for information mapped to a certain specific field in the DCI format between the base station apparatus 100 and the mobile station apparatus 200 when the base station apparatus 100 has included a transmission instruction of channel state information in the DCI format to notify it to the mobile station apparatus 200.

That is, the base station apparatus 100 and the mobile station apparatus 200, when a transmission instruction of channel state information is included in a DCI format notified from the base station apparatus 100, changes the interpretation for the information mapped to a certain specific field in the DCI format as the information indicating one or more downlink component carriers for generating the channel state information.

That is, the base station apparatus 100 and the mobile station apparatus 200, when a transmission instruction of channel state information is included in a DCI format notified from the base station apparatus 100, changes the interpretation for the value set in a certain specific field in the DCI format as the value indicating one or more downlink component carriers for generating the channel state information.

For example, the base station apparatus 100 and the mobile station apparatus 200, when transmission of channel state information is included in a DCI format notified from the base station apparatus 100, can change the interpretation for the information mapped to a certain specific field in the DCI format as the information indicating one or more downlink component carriers for generating the channel state information.

For example, the base station apparatus 100 and the mobile station apparatus 200, when a transmission of channel state information is included in a DCI format notified from the base station apparatus 100, can change the interpretation for the value set in a certain specific field in the DCI format as the value indicating one or more downlink component carriers for generating the channel state information.

Hereinafter, in the present embodiment, it will be described that the base station apparatus 100 and the mobile station apparatus 200, when a transmission instruction of channel state information is included in a DCI format notified from the base station apparatus 100, change an interpretation for the information mapped to the component carrier indicator field in the DCI format, and interpret it as the information indicating one or more downlink component carriers for generating channel state information. But, needless to say, a certain specific field in the DCI format may be a field other than the component carrier indicator field.

The base station apparatus 100 and the mobile station apparatus 200, when a transmission instruction of channel state information is included in a DCI format notified from the base station apparatus 100, can change the interpretation for the information mapped to a certain specific field in a DCI format (any of fields to which the information transmitted using a DCI format which schedules PUSCH is mapped, as mentioned above) as the information indicating one or more downlink component carriers for generating the channel state information.

Here, when a transmission instruction of channel state information is included in a DCI format notified from the base station apparatus 100, it is defined by a specification or the like in advance that the interpretation for the information mapped to which a field(s) in the DCI format is to be changed (which a field(s) is made to be a certain specific field).

In FIG. 4, the base station apparatus 100 includes a transmission instruction of channel state information in a DCI format, and notifies it to the mobile station apparatus 200. Also, the base station apparatus 100 includes in this DCI format the information indicating that the mobile station apparatus 200 generates channel state information for a downlink signal transmitted on which downlink component carrier, and notifies it to the mobile station apparatus 200. For example, the base station apparatus 100 sets a CSI request included in a DCI format to "1", and at the same time, sets a value indicating one or more downlink component carriers for generating channel state information in a component carrier indicator field (for example, set a field expressed with 3 bits as "111"), and can notify it to the mobile station apparatus 200.

For example, in FIG. 4, the base station apparatus 100 sets a CSI request included in a DCI format to "1", and at the same time, sets a value indicating DCC1 (for example, "000") in the component carrier indicator field, and can notify it to the mobile station apparatus 200. In addition, for example, the base station apparatus 100 sets a CSI request included in a DCI format to "1", and at the same time, sets a value indicating DCC2 (for example, "001") in the component carrier indicator field, and can notify it to the mobile station apparatus 200. Moreover, for example, the base station apparatus 100 sets a CSI request included in a DCI format to "1", and at the same time, sets a value indicating DCC3 (for example, "010") in the component carrier indicator field, and can notify it to the mobile station apparatus 200.

The mobile station apparatus 200 which is notified of this DCI format from the base station apparatus 100, based on a transmission instruction of channel state information included in a DCI format and information indicating one or more downlink component carriers for generating channel state information, generates the channel state information, and transmits the generated channel state information to the base station apparatus 100.

For example, in FIG. 4, the mobile station apparatus 200, based on an instruction from the base station apparatus 100, generates channel state information for a downlink signal transmitted on DCC1, and can transmit the generated channel state information to the base station apparatus 100. In addition, for example, the mobile station apparatus 200, based on an instruction from the base station apparatus 100, generates channel state information for a downlink signal transmitted on DCC2, and can transmit the generated channel state information to the base station apparatus 100. Moreover, for example, the mobile station apparatus 200, based on an instruction from the base station apparatus 100, generates channel state information for a downlink signal transmitted on DCC3, and can transmit the generated channel state information to the base station apparatus 100.

Here, in the above-mentioned descriptions, for making descriptions easy to understand, it has been described that the base station apparatus 100 sets a value indicating one or more downlink component carriers for generating channel state information in the component carrier indicator field, but, when a transmission instruction of channel state information is included in a DCI format notified from the base station apparatus 100, the name may be changed (the name referred to as component carrier indicator field may be changed), since an interpretation for the information mapped to a component carrier indicator field is changed between the base station apparatus 100 and the mobile station apparatus 200.

Here, it is configured for the mobile station apparatus 200 using the RRC signaling, for example, by the base station apparatus 100 that when a certain specific field in a DCI format notified from the base station apparatus 100 indicates which value, the mobile station apparatus 200 generates channel state information for a downlink signal(s) transmitted on which a downlink component carrier(s). That is, the base station apparatus 100 can configure, for the mobile station apparatus 200, mapping (correspondence) between a value set to a certain specific field in a DCI format and the information indicating one or more downlink component carriers for the mobile station apparatus 200 to generate channel state information.

In addition, it may be defined by a specification or the like in advance that when a certain specific field in a DCI format notified from the base station apparatus 100 indicates which value, the mobile station apparatus 200 generates channel state information for a downlink signal(s) transmitted on which a downlink component carrier(s).

FIG. 5 is an example showing that, based on a value set to a certain specific field in a DCI format notified from the base station apparatus 100, the mobile station apparatus 200 transmits channel state information for a downlink signal(s) transmitted on which a downlink component carrier(s). For example, the base station apparatus 100 can configure, for the mobile station apparatus 200, information (correspondence, mapping) as shown in FIG. 5 using the RRC signaling. In addition, for example, information as shown in FIG. 5 (correspondence, mapping) may be defined by a specification or the like in advance.

In FIG. 5, as an example, a certain specific field in a DCI format is expressed with 3 bits, and one or more downlink component carriers for the mobile station apparatus 200 to generate channel state information are corresponding to (mapped to) each of information (information of 8 types) indicated with 3 bits. As mentioned above, for example, the base station apparatus 100 can indicate the one or more downlink component carriers for the mobile station apparatus 200 to generate the channel state information using the component carrier indicator field (expressed with 3 bits) in the DCI format.

As shown in FIG. 5, for example, the base station apparatus 100, by notifying the mobile station apparatus 200 of a DCI format where a certain specific field is set to "000", can instruct the mobile station apparatus 200 to generate the channel state information for the downlink signal transmitted on DCC1. The mobile station apparatus 200, based on the instruction from the base station apparatus 100, generates the channel state information for the downlink signal transmitted on DCC1.

In addition, for example, the base station apparatus 100, by notifying the mobile station apparatus 200 of a DCI format where a certain specific field is set to "011", can instruct the mobile station apparatus 200 to generate the channel state information for each of downlink signals transmitted on DCC1 and DCC2. The mobile station apparatus 200, based on the instruction from the base station apparatus 100, generates the channel state information for each of downlink signals transmitted on DCC1 and DCC2.

That is, the base station apparatus 100 can instruct the mobile station apparatus 200 to generate the channel state information for each of downlink signals transmitted on a plurality of downlink component carriers. The mobile station apparatus 200, based on the instruction from the base station apparatus 100, generates the channel state information for each of downlink signals transmitted on the plurality of downlink component carriers, and transmits the generated channel state information to the base station apparatus 100.

Here, the mobile station apparatus 200 generates a plurality of pieces of channel state information for each of downlink signals transmitted on the plurality of downlink component carriers, and can transmit the generated channel state information to the base station apparatus 100. In addition, the mobile station apparatus 200, from every downlink signals transmitted on the plurality of downlink component carriers, generates one piece of channel state information, for example, and may transmit the generated one piece of channel state information to the base station apparatus 100.

In addition, for example, the base station apparatus 100, by notifying the mobile station apparatus 200 of a DCI format where a certain specific field is set to "110", can instruct the mobile station apparatus 200 to generate the channel state information for each of downlink signals transmitted on DCC1, DCC2 and DCC3. The mobile station apparatus 200, based on the instruction from the base station apparatus 100, generates the channel state information for each of downlink signals transmitted on DCC1, DCC2 and DCC3.

That is, the base station apparatus 100 can instruct the mobile station apparatus 200 to generate the channel state information for each of downlink signals transmitted on all the downlink component carriers configured in the mobile station apparatus 200. Here, the base station apparatus 100, using the RRC signaling, for example, can configure (in advance), for the mobile station apparatus 200, a set of downlink component carriers used for communication with the mobile station apparatus 200 (for example, a set of DCC where PDSCH may be allocated using PDCCH, also referred to as a DCC set). In FIG. 5, as an example, it is shown that the base station apparatus 100 has configured DCC1, DCC2 and DCC3 as the DCC set in the mobile station apparatus 200.

The mobile station apparatus 200 notified of a DCI format where a certain specific field is set to "110" from the base station apparatus 100 generates the channel state information for each of downlink signals transmitted on all the downlink component carriers (DCC set) configured by the base station apparatus 100, and transmits the generated channel state information to the base station apparatus 100.

Here, the mobile station apparatus 200 generates a plurality of pieces of channel state information for each of downlink signals transmitted on all the downlink component carriers configured by the base station apparatus 100, and can transmit the generated channel state information to the base station apparatus 100. In addition, the mobile station apparatus 200, from every downlink signals transmitted on all the downlink component carriers configured by the base station apparatus 100, generates one piece of channel state information, for example, and may transmit the generated one piece of channel state information to the base station apparatus 100.

Returning to FIG. 4, the mobile station apparatus 200 notified of a DCI format from the base station apparatus 100, based on a transmission instruction of channel state information and information indicating one or more downlink component carriers for generating the channel state information which are included in a DCI format, generates the channel state information, and transmits the generated channel state information to the base station apparatus 100.

At this time, the mobile station apparatus 200 maps the channel state information for the downlink signal transmitted on the one or more downlink component carriers instructed by the base station apparatus 100 to PUSCH mapped on an uplink component carrier corresponding to the downlink component carrier where PDCCH for a DCI format including a transmission instruction of the channel state information has been mapped, and can transmit it to the base station apparatus 100.

As mentioned above, for example, the base station apparatus 100 and the mobile station apparatus 200, when a transmission instruction of channel state information is included in a DCI format notified from the base station apparatus 100, can change the interpretation for the information (set value) mapped to a component carrier indicator field in the DCI format as the information (value) indicating one or more downlink component carriers for generating channel state information.

At this time, the base station apparatus 100 cannot indicate to the mobile station apparatus 200 that PUSCH mapped on which uplink component carrier is scheduled by a DCI format which schedules PUSCH. In such a case, the mobile station apparatus 200 can map the generated channel state information to PUSCH mapped on an uplink component carrier corresponding to the downlink component carrier where PDCCH for a DCI format which schedules PUSCH has been mapped, and can transmit it to the base station apparatus 100.

For example, in FIG. 4, the base station apparatus 100 maps a DCI format which schedules PUSCH on DCC2 to notify it to the mobile station apparatus 200. Here, the base station apparatus 100 sets a value indicating an uplink component carrier where PUSCH of which scheduling is carried out by DCI format is mapped on a component carrier indicator field included in a DCI format, and notifies it to mobile station apparatus 200. For example, the base station apparatus 100 sets "001" indicating UCC1 to a value indicating an uplink component carrier where PUSCH of which scheduling is carried out by DCI format is mapped, and can notify it to the mobile station apparatus 200.

At this time, in a DCI format notified of from the base station apparatus 100 to the mobile station apparatus 200, a transmission instruction of channel state information is not included. For example, a CSI request included in a DCI format notified from the base station apparatus 100 to the mobile station apparatus 200 has been set to "0".

In FIG. 4, the mobile station apparatus 200 notified of a DCI format from the base station apparatus 100 maps uplink data, for example, to PUSCH scheduled by the base station apparatus 100, and transmits it to the base station apparatus 100. That is, the mobile station apparatus 200, based on a value set to a component carrier indicator field, maps uplink data to PUSCH mapped on the indicated uplink component carrier, and transmits it to the base station apparatus 100. For example, the mobile station apparatus 200, based on the value ("000") set to the component carrier indicator field, maps the uplink data to PUSCH mapped on UCC1, and transmits it to the base station apparatus 100.

In addition, in FIG. 4, the base station apparatus 100 includes a transmission instruction of channel state information in a DCI format mapped on DCC2 to notify it to the mobile station apparatus 200. For example, the base station apparatus 100 sets to "1" a CSI request included in a DCI format mapped on DCC2, and notifies it to the mobile station apparatus 200.

Here, the base station apparatus 100, in a component carrier indicator field (also may be a certain specific field) in a DCI format, sets a value indicating one or more downlink component carriers for the mobile station apparatus 200 to generate channel state information, and notifies it to the mobile station apparatus 200. For example, the base station apparatus 100, in a component carrier indicator field in a DCI format, sets "010" indicating DCC3 to a value indicating a downlink component carrier for the mobile station apparatus 200 to generate channel state information, and notifies it to the mobile station apparatus 200.

The base station apparatus 100 and the mobile station apparatus 200, based on whether a transmission instruction of channel state information is included in a DCI format notified from the base station apparatus 100, change an interpretation for a value set to a component carrier indicator field in a DCI format (change interpretation based on whether it is a value indicating one or more downlink component carriers, or whether it is a value indicating an uplink component carrier).

In FIG. 4, the mobile station apparatus 200 notified of a DCI format including a transmission instruction of channel state information from the base station apparatus 100 maps the channel state information to PUSCH scheduled by the base station apparatus 100, and transmits it to the base station apparatus 100. Here, the mobile station apparatus 200, based on a value set to the component carrier indicator field (value indicating one or more downlink component carriers for generating channel state information), generates the channel state information for the downlink signal transmitted on the indicated downlink component carrier. For example, the mobile station apparatus 200, based on the value ("010") set to the component carrier indicator field, generates the channel state information for the downlink signal transmitted on DCC3.

In addition, the mobile station apparatus 200 maps the generated channel state information to PUSCH mapped on an uplink component carrier corresponding to the downlink component carrier where PDCCH for the DCI format which schedules PUSCH has been mapped, and transmits it to the base station apparatus 100. For example, the mobile station apparatus 200 maps the generated channel state information to PUSCH mapped on UCC2 corresponding to DCC2 where PDCCH for the DCI format which schedules PUSCH has been mapped, and transmits it to the base station apparatus 100. Here, the base station apparatus 100 has configured a correspondence between DCC2 and UCC2 using the broadcast information or the RRC signaling in the mobile station apparatus 200 in advance.

In addition, in FIG. 4, the base station apparatus 100 includes a transmission instruction of channel state information in a DCI format mapped on a primary downlink component carrier to notify it to the mobile station apparatus 200. For example, the base station apparatus 100 sets a CSI request included in a DCI format to "1" mapped on the primary downlink component carrier, and notifies it to the mobile station apparatus 200. As mentioned above, the base station apparatus 100 can configure, for the mobile station apparatus 200, a certain specific downlink component carrier among a plurality of downlink component carriers as a primary downlink component carrier.

Here, the base station apparatus 100 sets, in a component carrier indicator field (also may be a certain specific field) in a DCI format, a value indicating one or more downlink component carriers for the mobile station apparatus 200 to generate channel state information, and notifies it to the mobile station apparatus 200. For example, the base station apparatus 100 sets "010" indicating DCC3 to a value indicating the downlink component carrier for the mobile station apparatus 200 to generate the channel state information in the component carrier indicator field in the DCI format, and notifies it to the mobile station apparatus 200.

The base station apparatus 100 and the mobile station apparatus 200, based on whether a transmission instruction of channel state information is included in a DCI format notified from the base station apparatus 100, change an interpretation for a value set to a component carrier indicator field in a DCI format (change interpretation based on whether it is a value indicating one or more downlink component carriers, or whether it is a value indicating an uplink component carrier).

In FIG. 4, the mobile station apparatus 200 notified of a DCI format including a transmission instruction of channel state information from the base station apparatus 100 maps the channel state information to PUSCH scheduled by the base station apparatus 100, and transmits it to the base station apparatus 100. Here, the mobile station apparatus 200, based on a value (value indicating one or more downlink component carriers for generating channel state information) set to the component carrier indicator field, generates the channel state information for the downlink signal transmitted on the indicated downlink component carrier. For example, the mobile station apparatus 200, based on the value ("010") set to the component carrier indicator field, generates the channel state information for the downlink signal transmitted on DCC3.

In addition, the mobile station apparatus 200 maps the generated channel state information to PUSCH mapped on an uplink component carrier corresponding to a primary downlink component carrier where PDCCH for a DCI format which schedules PUSCH has been mapped, and transmits it to the base station apparatus 100. That is, the mobile station apparatus 200 maps the generated channel state information to PUSCH mapped on the primary uplink component carrier, and transmits it to the base station apparatus 100. That is, the base station apparatus 100 includes a transmission instruction of channel state information in the DCI format mapped on the primary downlink component carrier to notify it to the mobile station apparatus 200, and the mobile station apparatus 200 maps the generated channel state information to PUSCH mapped on the primary uplink component carrier, and transmits it to the base station apparatus 100.

Here, the base station apparatus 100 has configured in advance, for the mobile station apparatus 200, a correspondence between the primary downlink component carrier and the primary uplink component carrier using the broadcast information or the RRC signaling.

As mentioned above, the base station apparatus 100 and the mobile station apparatus 200, based on whether a transmission instruction of channel state information is included in a DCI format notified from the base station apparatus 100, change the interpretation for information mapped to the certain specific field in the DCI format.

That is, the mobile station apparatus 200, when generating channel state information (may be also when mapping the information to PUSCH), confirms first whether a transmission of channel state information has been indicated, and after that, confirms the information (set value) mapped to a certain specific field. For example, the mobile station apparatus 200, when generating the channel state information, confirms first a value set to a CSI request (CSI request field), and after that, confirms a value set to a component carrier indicator field. The mobile station apparatus 200, based on the value set to the CSI request which has been confirmed first, changes the interpretation for the value set after that which has been set to the component carrier indicator field.

As shown above, the base station apparatus 100 includes, in a DCI format, information indicating one or more downlink component carriers for generating channel state information to transmit it to the mobile station apparatus 200, and thereby, the base station apparatus 100 can specify flexibly the one or more downlink component carriers which will be a generation (measurement) object when the mobile station apparatus 200 generates channel state information.

The mobile station apparatus 200 transmits to the base station apparatus 100 channel state information for a downlink signal(s) transmitted on a downlink component carrier(s) indicated by the base station apparatus 100, and thereby, the base station apparatus 100 can schedule radio resources in consideration of a spectrum efficiency.

In addition, the base station apparatus 100 includes information indicating one or more downlink component carriers for generating channel state information in a DCI format to transmit it to the mobile station apparatus 200, and thereby, can specify dynamically one or more downlink component carriers which will be a generation (measurement) object when the mobile station apparatus 200 generates the channel state information.

Furthermore, the base station apparatus 100 and the mobile station apparatus 200, when a transmission instruction of channel state information is included in a DCI format notified from the base station apparatus 100, change an interpretation for information mapped to a certain specific field in a DCI format, and interpret it as information indicating one or more downlink component carriers for generating channel state information, and thereby, the base station apparatus 100 can indicate one or more downlink component carriers for generating channel state information without addition of a new field for indicating a generation object of channel state information.

In addition, the present invention can also take an aspect as shown in the following. That is, a mobile communication system of the present invention is the mobile communication system where a base station apparatus and a mobile station apparatus perform communication using a plurality of component carriers, wherein the base station apparatus notifies the mobile station apparatus of a downlink control information format which schedules a physical uplink shared channel, and the mobile station apparatus, when a transmission instruction of channel state information is included in the downlink control information format, changes an interpretation for information mapped to a certain specific field in the downlink control information format, and generates channel state information for the downlink component carrier indicated by the information.

Moreover, information mapped to the certain specific field, when a transmission instruction of the channel state information is not included in the downlink control information format, is interpreted as the information indicating an uplink component carrier where the physical uplink shared channel scheduled by the downlink control information format has been arranged.

In addition, the mobile station apparatus maps the generated channel state information to the physical uplink shared channel arranged in an uplink component carrier corresponding to a downlink component carrier where a physical downlink control channel of the downlink control information format including a transmission instruction of the channel state information has been arranged, and transmits it to the base station apparatus.

Moreover, the base station apparatus configures in the mobile station apparatus a correspondence between the downlink component carrier and the uplink component carrier using broadcast information.

In addition, abase station apparatus in a mobile communication system where the base station apparatus and a mobile station apparatus perform communication using a plurality of component carriers, includes: a device to notify the mobile station apparatus of a downlink control information format which schedules a physical uplink shared channel; and a device to change an interpretation for information mapped to a certain specific field in the downlink control information format when having included a transmission instruction of channel state information in the downlink control information format, and to receive from the mobile station apparatus channel state information for a downlink component carrier indicated by the information.

Moreover, the device to receive the channel state information from the mobile station apparatus receives, from the mobile station apparatus, the channel state information mapped to the physical uplink shared channel arranged in an uplink component carrier corresponding to a downlink component carrier where a physical downlink control channel of the downlink control information format including a transmission instruction of the channel state information has been arranged.

In addition, a mobile station apparatus in a mobile communication system where a base station apparatus and the mobile station apparatus perform communication using a plurality of component carriers, includes: a device by which a downlink control information format which schedules a physical uplink shared channel is notified from the base station apparatus; and a device to change an interpretation for information mapped to a certain specific field in the downlink control information format when a transmission instruction of channel state information is included in the downlink control information format, and to generate channel state information for a downlink component carrier indicated by the information.

Moreover, the mobile station apparatus includes a device to map the generated channel state information to the physical uplink shared channel arranged in an uplink component carrier corresponding to a downlink component carrier where a physical downlink control channel of the downlink control information format including a transmission instruction of the channel state information has been arranged, and to transmit it to the base station apparatus.

In addition, a communication method is the communication method of a base station apparatus in a mobile communication system where the base station apparatus and a mobile station apparatus perform communication using a plurality of component carriers, wherein the base station apparatus notifies the mobile station apparatus of a downlink control information format which schedules a physical uplink shared channel, and changes an interpretation for information mapped to a certain specific field in the downlink control information format when having included a transmission instruction of channel state information in the downlink control information format, and receives from the mobile station apparatus channel state information for a downlink component carrier indicated by the information.

Moreover, the base station apparatus receives from the mobile station apparatus the channel state information mapped to the physical uplink shared channel arranged in an uplink component carrier corresponding to a downlink component carrier where a physical downlink control channel of the downlink control information format including a transmission instruction of the channel state information has been arranged.

In addition, a communication method is the communication method of a mobile station apparatus in a mobile communication system where a base station apparatus and the mobile station apparatus perform communication using a plurality of component carriers, wherein the mobile station apparatus is notified of a downlink control information format which schedules a physical uplink shared channel from the base station apparatus, and changes an interpretation for information mapped to a certain specific field in the downlink control information format when a transmission instruction of channel state information is included in the downlink control information format, and generates channel state information for a downlink component carrier indicated by the information.

Moreover, the mobile station apparatus maps the generated channel state information to the physical uplink shared channel arranged in an uplink component carrier corresponding to a downlink component carrier where a physical downlink control channel of the downlink control information format including a transmission instruction of the channel state information has been arranged, and transmits it to the base station apparatus.

In addition, abase station apparatus in a mobile communication system where the base station apparatus and a mobile station apparatus perform communication using a plurality of component carriers, includes: a base station side transmission part which notifies the mobile station apparatus of a downlink control information format which schedules a physical uplink shared channel; and a base station side reception part which changes an interpretation for information mapped to a certain specific field in the downlink control information format when having included a transmission instruction of channel state information in the downlink control information format, and receives from the mobile station apparatus channel state information for a downlink component carrier indicated by the information.

Moreover, the base station side reception part which receives the channel state information from the mobile station apparatus receives, from the mobile station apparatus, the channel state information mapped to the physical uplink shared channel arranged in an uplink component carrier corresponding to a downlink component carrier where a physical downlink control channel of the downlink control information format including a transmission instruction of the channel state information has been arranged.

In addition, a mobile station apparatus in a mobile communication system where a base station apparatus and the mobile station apparatus perform communication using a plurality of component carriers, includes: a mobile station side reception part notified of a downlink control information format which schedules a physical uplink shared channel from the base station apparatus; and a channel estimation part which changes an interpretation for information mapped to a certain specific field in the downlink control information format when a transmission instruction of channel state information is included in the downlink control information format, and generates channel state information for a downlink component carrier indicated by the information.

Moreover, the mobile station apparatus includes a mobile station side transmission part which maps the generated channel state information to the physical uplink shared channel arranged in an uplink component carrier corresponding to a downlink component carrier where a physical downlink control channel of the downlink control information format including a transmission instruction of the channel state information has been arranged, and transmits it to the base station apparatus.

Embodiments described above are applied also to an integrated circuit/chip set mounted on the base station apparatus 100 and the mobile station apparatus 200. In addition, in embodiments described above, by recording on a computer-readable recording medium programs for realizing each function in the base station apparatus 100, and/or each function in the mobile station apparatus 200 and by causing a computer system to read and execute programs recorded on this recording medium, control of the base station apparatus 100 and/or the mobile station apparatus 200 may be performed. Besides, the "computer system" referred to herein is assumed to include an OS and/or hardware such as peripheral devices.

In addition, the "computer readable recording medium" refers to a portable medium such as a flexible disk, a magnetic optical disk, a ROM and a CD-ROM, and a storage device such as a hard disk incorporated in the computer system. Furthermore, the "computer readable recording medium" is also assumed to include one which holds a program dynamically in a short time like a network such as the Internet and/or a communication line when transmitting a program via a communication channel such as a telephone line, and one which holds a program in a certain period of time like a volatile memory inside the computer system which will be, in that case, a server and/or a client. In addition, the above-mentioned programs may be ones for realizing a part of functions mentioned above, and furthermore, may be ones which can realize functions mentioned above in combination with programs already recorded on the computer system.

As described above, embodiments of the invention have been described referring to the drawings, but, concrete configurations are not limited to these embodiments, and design or the like within a range not departing from gists of this invention is included in the scope of Claims.

DESCRIPTION OF SYMBOLS

100 Base station apparatus
101 Data control unit
102 Transmission data modulation unit
103 Radio unit
104 Scheduling unit
105 Channel estimation unit
106 Reception data demodulation unit
107 Data extraction unit
108 Higher layer
109 Antenna
110 Radio resource control unit
200 (200A, 200B, 200C) Mobile station apparatus
201 Data control unit
202 Transmission data modulation unit
203 Radio unit
204 Scheduling unit
205 Channel estimation unit
206 Reception data demodulation unit
207 Data extraction unit
208 Higher layer
209 Antenna
210 Radio resource control unit

The invention claimed is:

1. A base station apparatus which is configured to communicate with a mobile station apparatus using a plurality of downlink component carriers, the base station apparatus comprising:

a transmitting unit configured to transmit, to the mobile station apparatus, a higher layer signal including first information used for configuring a first set of one or more downlink component carriers and a second set of one or more downlink component carriers, the first set corresponding to a first value of a field of second information, the second set corresponding to a second value of the field of the second information, the second information being used for requesting a transmission of channel state information, wherein the transmitting unit is configured to transmit using a physical downlink control channel, to the mobile station apparatus, downlink control information including the second information, the downlink control information being used for scheduling of a physical uplink shared channel in one uplink component carrier; and a receiving unit configured to receive using the physical uplink shared channel, from the mobile station apparatus, the channel state information for the first set of the one or more downlink component carriers which is configured in a case that the downlink control information including the second information is transmitted and a value of the field of the second information is the first value, wherein the receiving unit is configured to receive using the physical uplink shared channel, from the mobile station apparatus, the channel state information for the second set of the one or more downlink component carriers which is configured in a case that the downlink control information including the second information is transmitted and a value of the field of the second information is the second value.

2. A mobile station apparatus which is configured to communicate with a base station apparatus using a plurality of downlink component carriers, the mobile station apparatus comprising:

a receiving unit configured to receive, from the base station apparatus, a higher layer signal including first information used for configuring a first set of one or more downlink component carriers and a second set of one or more downlink component carriers, the first set corresponding to a first value of a field of second information, the second set corresponding to a second value of the field of the second information, the second information being used for requesting a transmission of channel state information, wherein the receiving unit is configured to receive using a physical downlink control channel, from the base station apparatus, downlink control information including the second information, the downlink control information being used for scheduling of a physical uplink shared channel in one uplink component carrier; and a transmitting unit configured to transmit using the physical uplink shared channel, to the base station apparatus, the channel state information for the first set of the one or more downlink component carriers which is configured a case that the downlink control information including the second information is received and a value of the field of the second information is the first value, wherein the transmitting unit using the physical uplink shared channel, to the base station apparatus, the channel state information for the second set of the one or more downlink component carriers which is configured in a case that the downlink control information including the second information is received and a value of the field of the second information is the second value.

3. A communication method of a base station apparatus which is configured to communicate with a mobile station apparatus using a plurality of downlink component carriers, the communication method comprising:

transmitting, to the mobile station apparatus, a higher layer signal including first information used for configuring a first set of one or more downlink component carriers and a second set of one or more downlink component carriers, the first set corresponding to a first value of a field of second information, the second set corresponding to a second value of the field of the second information, the second information being used for requesting a transmission of channel state information, transmitting using a physical downlink control channel, to the mobile station apparatus, downlink control information including the second information, the downlink control information being used for scheduling a physical uplink shared channel in one uplink component carrier, receiving using the physical uplink shared channel, from the mobile station apparatus, the channel state information for the first set of the one or more downlink component carriers which is configured in a case that the downlink control information including the second information is transmitted and a value of the field of the second information is the first value, and receiving using the physical uplink shared channel, from the mobile station apparatus, the channel state information for the second set of the one or more downlink component carriers which is configured in a case that the downlink control information including the second information is transmitted and a value of the field of the second information is the second value.

4. A communication method of a mobile station apparatus which is configured to communicate with a base station apparatus using a plurality of downlink component carriers, the communication method comprising:

receiving, from the base station apparatus, a higher layer signal including first information used for configuring a first set of one or more downlink component carriers and a second set of one or more downlink component carriers, the first set corresponding to a first value of a field of second information, the second set corresponding to a second value of the field of the second information, the second information being used for requesting a transmission of channel state information, receiving using a physical downlink control channel, from the base station apparatus, downlink control information including the second information, the downlink control information being used for scheduling of a physical uplink shared channel in one uplink component carrier, transmitting using the physical uplink shared channel, to the base station apparatus, the channel state information for the first set of the one or more downlink component carriers which is configured in a case that the downlink control information including the second information is received and a value of the field of the second information is the first value, and transmitting using the physical uplink shared channel, to the base station apparatus, the channel state information for the second set of the one or more downlink component carriers which is configured in a case that the downlink control information including the second information is received and a value of the field of the second information is the second value.

5. An integrated circuit mounted on a base station apparatus which is configured to communicate with a mobile station apparatus using a plurality of downlink component carriers, the integrated circuit comprising functions of:

transmitting, to the mobile station apparatus, a higher layer signal including first information used for configuring a first set of one or more downlink component carriers and a second set of one or more downlink component carriers, the first set corresponding to a first value of a field of second information, the second set corresponding to a second value of the field of the second information, the second information being used for requesting a transmission of channel state information, transmitting using a physical downlink control channel, to the mobile station apparatus, downlink control information including the second information, the downlink control information being used for scheduling of a physical uplink shared channel in one uplink component carrier, receiving using the physical uplink shared channel, from the mobile station apparatus, the channel state information for the first set of the one or more downlink component carriers which is configured in a case that the downlink control information including the second information is transmitted and a value of the field of the second information is the first value, and receiving using the physical uplink shared channel, from the mobile station apparatus, the channel state information for the second set of the one or more downlink component carriers which is configured in a case that the downlink control information including the second information is transmitted and a value of the field of the second information is the second value.

6. An integrated circuit mounted on a mobile station apparatus which is configured to communicate with a base station apparatus using a plurality of downlink component carriers, the integrated circuit comprising functions of:

receiving, from the base station apparatus, a higher layer signal including first information used for configuring a first set of one or more downlink component carriers and a second set of one or more downlink component carriers, the first set corresponding to a first value of a field of second information, the second set corresponding to a second value of the field of the second information, the second information being used for requesting a transmission of channel state information, receiving using a physical downlink control channel, from the base station apparatus, downlink control information including the second information, the downlink control information being used for scheduling of a physical uplink shared channel in one uplink component carrier, transmitting using the physical uplink shared channel, to the base station apparatus, the channel state information for the first set of the one or more downlink component carriers which is configured in a case that the downlink control information including the second information is received and a value of the field of the second information is the first value, and transmitting using the physical uplink shared channel, to the base station apparatus, the channel state information for the second set of the one or more downlink component carriers which is configured in a case that the downlink control information including the second information is received and a value of the field of the second information is the second value.

* * * * *

UNITED STATES PATENT AND TRADEMARK OFFICE
CERTIFICATE OF CORRECTION

PATENT NO. : 8,891,474 B2
APPLICATION NO. : 13/699204
DATED : November 18, 2014
INVENTOR(S) : Tatsushi Aiba et al.

Page 1 of 1

It is certified that error appears in the above-identified patent and that said Letters Patent is hereby corrected as shown below:

IN THE CLAIMS:

In claim 2, at column 33, lines 14-15, change "which is configured a case that" to --which is configured in a case that--.

In claim 2, at column 33, line 18, change "the transmitting unit using" to --the transmitting unit is configured to transmit using--.

Signed and Sealed this
Eighth Day of September, 2015

Michelle K. Lee
*Director of the United States Patent and Trademark Office*